US008087240B2

(12) United States Patent
Morinaga et al.

(10) Patent No.: US 8,087,240 B2
(45) Date of Patent: Jan. 3, 2012

(54) CONTROL APPARATUS FOR WORK MACHINE

(75) Inventors: Jun Morinaga, Yokohama (JP); Tadashi Kawaguchi, Hiratsuka (JP); Hiroaki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 661 days.

(21) Appl. No.: 12/084,326

(22) PCT Filed: Oct. 26, 2006

(86) PCT No.: PCT/JP2006/321430

§ 371 (c)(1), (2), (4) Date: Jan. 13, 2009

(87) PCT Pub. No.: WO2007/052538

PCT Pub. Date: May 10, 2007

(65) Prior Publication Data

US 2009/0301075 A1 Dec. 10, 2009

(30) Foreign Application Priority Data

Oct. 31, 2005 (JP) ................................ 2005-317133

(51) Int. Cl.
*F16D 31/02* (2006.01)

(52) U.S. Cl. .............................. 60/414; 60/433; 60/445

(58) Field of Classification Search ................... 60/414, 60/433, 434, 445

See application file for complete search history.

(56) References Cited

U.S. PATENT DOCUMENTS 6,666,022 B1 * 12/2003 Yoshimatsu et al. ............ 60/414
6,708,787 B2 3/2004 Naruse et al.
7,525,206 B2 * 4/2009 Kagoshima et al. ..... 180/65.265

FOREIGN PATENT DOCUMENTS

| | | |
|---|---|---|
| JP | 11-071788 | 3/1999 |
| JP | 2002-275945 | 9/2002 |
| JP | 2003-278705 | 10/2003 |
| JP | 2003-328397 | 11/2003 |
| JP | 2004-150307 | 5/2004 |
| JP | 2005-325883 | 11/2005 |
| JP | 2006-348978 | 12/2006 |

OTHER PUBLICATIONS

Decision of a Patent Grant for Japanese Patent Application No. 2007-542668 issued Mar. 15, 2011.
International Search Report, dated Nov. 10, 2006, PCT/JP2006/321430.

* cited by examiner

*Primary Examiner* — Michael Leslie
(74) *Attorney, Agent, or Firm* — Edwards Wildman Palmer LLP

(57) ABSTRACT

A speed of a hydraulic actuator is matched with that of an electric actuator when the hydraulic actuator and the electric actuator are concurrently actuated. When determination units (71, 72) determine that a boom hydraulic cylinder (31) and a rotation generator motor (11) are concurrently actuated based on a controlled variable of a boom control lever (41) and a controlled variable of a rotation control lever (42), a torque of the rotation generator motor (11) is restricted based on a pump discharge pressure (Pp). Therefore, for example, a torque limit command is generated and output such that a torque limit value (TL2) of the rotation generator motor (11) is decreased with a decrease in discharge pressure (Pp) of a hydraulic pump (3).

6 Claims, 16 Drawing Sheets

CONTROL APPARATUS FOR WORK MACHINE

TECHNICAL FIELD

The present invention relates to a control apparatus for a work machine, particularly to an apparatus suitable for control of a hybrid construction machine in which a generator motor assists a driving force of an engine.

BACKGROUND ART

Hoist rotary work can be cited as a typical work performed by a hydraulic shovel. In the hoist rotary work, earth and sand located below are loaded by a boom, an upper rotary body is rotated by a predetermined angle (for example, 90°) while the boom is being lifted, and the earth and sand are loaded on a loading platform of a dumper truck. During the hoist rotary work, the lifting of the boom and the rotation of the upper rotary body are simultaneously performed by a combined operation of a boom control lever and a rotary control lever.

A configuration of a conventional construction machine 1 will schematically be described with reference to FIG. 1. For the purpose of easy understanding, only the configuration used to actuate the upper rotary body and the boom is extracted and shown in FIG. 1. As shown in FIG. 1, a hydraulic pump 3 is driven using a diesel engine 2 which is a driving source. A variable displacement hydraulic pump is used as the hydraulic pump 3, and a volume q (cc/rev) is changed by changing an inclination angle of a swash plate 3*a*. Pressurized oil discharged from the hydraulic pump 3 at a discharge pressure Pp and a flow rate Q (cc/min) is supplied to a boom hydraulic cylinder 31 and a rotary hydraulic actuator 32 through a control valve 21 and a control valve 22 respectively. The control valve 21 and the control valve 22 are actuated by control levers 41 and 42. The hydraulic actuators 31 and 32 are driven by supplying the pressurized oil to the hydraulic actuators 31 and 32, thereby actuating the boom and upper rotary body which are connected to the hydraulic actuators 31 and 32.

Loads on the boom and upper rotary body are changed during the operation of the construction machine 1, which changes a load (hydraulic device load) on a hydraulic device (hydraulic pump 3), i.e., the load on the engine 2.

Load sensing control is performed to the hydraulic pump 3. That is, the inclination angle of the swash plate 3*a* is controlled such that pressure differences (pressure difference across control valve) ΔP between a discharge pressure Pp of the hydraulic pump 3 and load pressures (maximum load pressure) PLS of the hydraulic actuators 31 and 32 are kept constant.

Pressure compensation valves 51 and 52 are provided in the control valves 21 and 22 respectively such that a larger amount of pressurized oil is not supplied to the hydraulic actuator having a smaller load when the plural hydraulic actuators 31 and 32 are simultaneously actuated.

The pressure compensation valves 51 and 52 adjust the pressurized oil flowing into the control valves 21 and 22 such that the pressure differences ΔP across the control valves 21 and 22 are equal to each other. The pressure compensation valves 51 and 52 make the supply of the pressurized oil difficult by reducing the pressurized oil supplied to the control valve on the side on which the smaller load is applied.

A boom relief valve 61 is provided on a hydraulic passage connecting the control valve 21 and the hydraulic actuator 31. A rotary relief valve 62 is provided on a hydraulic passage connecting the control valve 22 and the hydraulic actuator 32.

A setting relief pressure Prf of the rotary relief valve 62 is lower than a setting relief pressure of the boom relief valve. This is because the pressurized oil having a constant pressure is supplied to the hydraulic actuator 32 to improve operability during the rotation by performing relief actuation of the rotary relief valve 62 when the rotary control lever 42 is operated. For example, the relief pressure Prf of the rotary relief valve 62 is set to 270 kg/cm$^2$ and the pressurized oil having the constant pressure of 270 kg/cm$^2$ is supplied to the hydraulic actuator 32.

However, when the hoist rotary work is performed in the configuration, the following problems are generated.

1) Deterioration in Speed Matching Between Rotation and Boom

In rotating the hoist, ideally the speed matching is achieved between the upper rotary body and the boom when the control levers 41 and 42 are turned down to full lever positions, and the boom is lifted just to the height of the loading platform of the dumper truck when the upper rotary body is rotated to the loading platform of the dumper truck. Therefore, as shown in FIG. 2A, it is necessary that power (output, horse power; kW) of the engine 2 be appropriately distributed between the boom hydraulic actuator 31 and the rotary hydraulic actuator 32. When the power of the engine 2 reaches 100 kW, ideally the power of 30 kW in the total power of 100 kW is distributed to the rotary hydraulic actuator 32 and the residual power of 70 kW is distributed to the boom hydraulic actuator 31.

However, as described above, the pressurized oil of the relief pressure Prf (maximum pressure) is supplied to the rotary hydraulic actuator 32 during the hoist rotary work. This power distribution of the engine 2 is shown in FIG. 2B. That is, the power of 40 kW in the output of 100 kW of the engine 2 is distributed to the rotary hydraulic actuator 32 and the residual power of 60 kW is distributed to the boom hydraulic actuator 31.

In the power distribution of FIG. 2B, the power distribution on the upper rotary body side becomes excessively larger compared with the boom side, and the rotary speed of the upper rotary body becomes faster compared with the boom lifting speed. Therefore, sometimes the boom is not lifted to the height of the loading platform when the upper rotary body is rotated to the loading platform of the dumper truck. It is necessary for an operator to not perform the full lever operation of the control levers 41 and 42 but finely adjust the control levers 41 and 42 in order to achieve the speed matching between the boom and the upper rotary body. Accordingly, high skill is required for the operator and operability is decreased in rotating the hoist.

2) Deterioration in Energy Loss and Fuel Efficiency

As described above, during the hoist rotary work, the relief actuation is performed to the rotary relief valve 62 while the pressure compensation control of reducing the pressurized oil supplied to the control valve on the side of the lighter load is performed. Therefore, the excessive pressurized oil is discharged to a tank, which leads to energy loss or fuel inefficiency.

In order to solve such problems, there has been a technique which has been practically used and in which, during the hoist rotary work unlike the normal work, the pressure compensation control is stopped and the swash plate 3*a* of the hydraulic pump 3 is controlled based only on the load pressure of the boom hydraulic actuator 31 (conventional technique).

According to the conventional technique, the pressure corresponding to the load pressure of the boom hydraulic actuator 31, i.e., the pressurized oil (for example, 200 kg/cm$^2$) lower than the relief pressure Prf (270 kg/cm$^2$) is supplied to the rotary hydraulic actuator 32 during the hoist rotary work.

Therefore, as shown in FIG. 2A, the power distribution of the engine 2 becomes close to the ideal distribution. When the control levers 41 and 42 are manipulated to the full lever position, the upper rotary body is rotated to the loading platform of the dumper truck, and the boom is lifted just to the height of the loading platform, which allows the substantially ideal hoist rotary work. The pressurized oil supplied to the control valve on the side of the lighter load is reduced due to the pressure compensation control, and the relief actuation of the rotary relief valve 62 is suppressed so that the problem of energy loss or fuel inefficiency is solved.

Patent Documents 1 and 2 also describe the technique in which the speed matching is achieved among the plural hydraulic actuators by adjusting the pressure of the pressurized oil supplied to each hydraulic actuator when the plural hydraulic actuators are actuated while combined with one another.

Patent Document 1: Japanese Patent Application Laid-Open No. 11-71788

Patent Document 2: Japanese Patent Application Laid-Open No. 2003-278705

DISCLOSURE OF THE INVENTION

Problem to be Solved by the Invention

In the field of the construction machine, the hybrid construction machine in which the generator motor assists the driving force of the engine is being developed, and many patent applications have already been filed.

FIG. 3 shows a configuration example of the hydraulic construction machine. Similarly to FIG. 1, a hydraulic pump 3 is driven by an engine 2. The pressurized oil discharged from the hydraulic pump 3 is supplied to a boom hydraulic actuator 31 (hereinafter, sometimes referred to as "a boom hydraulic cylinder 31"). A generator motor 4 is coupled to the output shaft of the engine 2. A storage device 10 supplies the electric power to the generator motor 4 while the electric power generated by the generator motor 4 is accumulated in the storage device 10. The upper rotary body is actuated by a rotation generator motor 11 which is the electric actuator. The rotation generator motor 11 is driven by the electric power generated by the generator motor 4 and/or the electric power accumulated in the storage device 10.

At this point, there is no limitation to a torque generated in the rotation generator motor 11. Therefore, power of 20 kW is supplied to the rotation generator motor 11 from the storage device 10 and power of 20 kW is supplied to the rotation generator motor 11 from the engine 2 which outputs power of 100 kW, so the rotation generator motor 11 can generate the torque (135 N·m) corresponding to the relief pressure Prf (270 kg/cm$^2$) of the rotary relief valve 62. The power of 40 kW is distributed to the rotation generator motor 11 and the power of 80 kW is distributed to the boom hydraulic actuator 31. Similarly to FIG. 2B, the power distribution deviates from the ideal state (FIG. 2A), the rotary speed of the upper rotary body becomes higher than the lifting speed of the boom, which leads to the deterioration in speed matching between the rotation and the boom.

Furthermore, the boom actuator is formed by the hydraulic actuator 31 while the rotary actuator is formed by the electric actuator 11. Therefore, the conventional technique cannot be applied to the configuration shown in FIG. 3 because the conventional technique is designed on the assumption that both the boom and the rotary actuators are formed by the hydraulic actuator. Additionally, the techniques disclosed in Patent Documents 1 and 2 cannot be applied because the disclosed techniques are designed on the assumption that both the boom and the rotary actuators are formed by the hydraulic actuator.

In view of the foregoing, a problem of the invention is to perform the speed matching between both the hydraulic actuator and the electric actuator when both the actuators are actuated while combined with each other.

Means for Solving Problem

According to one aspect of the present invention, a control apparatus for a work machine includes a hydraulic pump which is driven by an engine; a hydraulic actuator to which pressurized oil is supplied, the pressurized oil being discharged from the hydraulic pump; a generator motor which is coupled to an output shaft of the engine; a storage device which accumulates electric power generated by the generator motor and supplies electric power to the generator motor; an electric actuator which is driven by the electric power generated by the generator motor and/or the electric power accumulated in the storage device; a determination unit which determines whether or not the hydraulic actuator and the electric actuator are concurrently actuated; and a control unit for restricting a torque or a speed of the electric actuator when the determination unit determines that the hydraulic actuator and the electric actuator are concurrently actuated.

According to another aspect of the present invention, a control apparatus for a work machine includes a hydraulic pump which is driven by an engine; a hydraulic actuator to which pressurized oil is supplied, the pressurized oil being discharged from the hydraulic pump; a generator motor which is coupled to an output shaft of the engine; a storage device which accumulates electric power generated by the generator motor and supplies electric power to the generator motor; an electric actuator which is driven by the electric power generated by the generator motor and/or the electric power accumulated in the storage device; and a control unit for restricting load of the hydraulic pump such that the load of the hydraulic pump is decreased as power of the electric actuator is increased.

According to still another aspect of the present invention, a control apparatus for a work machine includes a hydraulic pump which is driven by an engine; a hydraulic actuator to which pressurized oil is supplied, the pressurized oil being discharged from the hydraulic pump; a generator motor which is coupled to an output shaft of the engine; a storage device which accumulates electric power generated by the generator motor and supplies electric power to the generator motor; an electric actuator which is driven by the electric power generated by the generator motor and/or the electric power accumulated in the storage device; a determination unit which determines whether or not the hydraulic actuator and the electric actuator are concurrently actuated; a first control unit which restricts a torque or a speed of the electric actuator when the determination unit determines that the hydraulic actuator and the electric actuator are concurrently actuated; and a second control unit for restricting load of the hydraulic pump such that the load of the hydraulic pump is decreased as power of the electric actuator is increased.

In the control apparatus, a torque limit or a speed limit of the electric actuator may be controlled to be decreased as a load on the hydraulic pump or the hydraulic actuator is decreased.

In the control apparatus, the hydraulic actuator actuates work equipment, and the electric actuator actuates an upper rotary body.

In the control apparatus, the hydraulic actuator may be a hydraulic actuator which includes a boom hydraulic actuator actuating a boom, the electric actuator may be an upper rotary body electric actuator actuating an upper rotary body, and the determination unit may determine whether or not a hoist rotary work is performed, in which the upper rotary body electric actuator actuating the upper rotary body so as to rotate the upper rotary body while the boom hydraulic actuator moves the boom upward.

The invention will be described with reference to the drawings. As shown in FIG. 5, determination units 71 and 72 determine whether or not the boom hydraulic cylinder 31 and the rotation generator motor 11 are concurrently actuated based on the controlled variable of the boom control lever 41 and the controlled variable of the rotary control lever 42. The hydraulic actuator may be an actuator (boom hydraulic cylinder 31) which actuates the work machine such as the boom, the electric actuator may be an actuator (rotation generator motor 11) which actuates the upper rotary body, and the hydraulic actuator and the electric actuator are not limited to the actuators described above. In the case where the hydraulic actuator is the boom hydraulic actuator while the electric actuator is the upper rotary body electric actuator, the determination units 71 and 72 determine whether or not the hoist rotary work is performed. In the hoist rotary work, the rotation generator motor 11 actuates the upper rotary body so as to rotate the upper rotary body while the boom hydraulic actuator 31 actuates the boom upward.

The first control unit performs controls described below. When the determination units 71 and 72 determine that the boom hydraulic cylinder 31 and the rotation generator motor 11 are concurrently actuated, the switching unit 73 generates and outputs the torque limit command for restricting the torque of the rotation generator motor 11 based on the pump discharge pressure Pp. For example, the torque limit command is generated and output such that the torque limit value TL2 of the rotation generator motor 11 decreases with decrease in discharge pressure Pp of the hydraulic pump 3. At this point, the load pressure of the hydraulic actuator (boom hydraulic cylinder 31) may be used instead of the pump discharge pressure Pp. The speed of the electric actuator (rotation generator motor 11) may be restricted instead of the restriction of the torque of the electric actuator (rotation generator motor 11).

When the determination units 71 and 72 determine that the combined operation such as the hoist rotary work is performed, the rotation generator motor 11 is controlled through the inverter 9 such that the torque generated in the rotation generator motor 11 does not exceed the computed torque limit value TL2.

The second control unit performs controls described below. The pump load command for restricting the load Wp of the hydraulic pump 3 is generated and output to the engine pump controller 17 such that the load Wp of the hydraulic pump 3 is decreased with increase in rotary output power Wsw based on the rotary output power Wsw and the throttle position S. The engine pump controller 17 controls the hydraulic pump 3 such that the pump load of the hydraulic pump 3 does not exceed the computed pump load Wp.

Both the control by the first control unit and the control by the second control unit may be performed, the control by the first control unit may be performed, and the control by the second control unit may be performed.

EFFECT OF THE INVENTION

Advantages of the invention will be described below in comparison with the comparative example. As shown in FIG. 4B, when the control is performed by the first control unit, the torque generated in the rotation generator motor 11 is restricted. Therefore, the power of 15 kW is supplied to the rotation generator motor 11 from the storage device 10 while the power of 15 kW is supplied to the rotation generator motor 11 from the engine 2 which outputs the power of 100 kW, thereby supplying the total power of 30 kW to the rotation generator motor 11. The torque (100 N·m) corresponding to the current discharge pressure Pp (200 kg/cm$^2$) of the hydraulic pump 3 or the current load pressure of the boom hydraulic cylinder 31 is generated in the rotation generator motor 11. The power of 30 kW is distributed to the rotation generator motor 11 while the power of 85 kW is distributed to the boom hydraulic actuator 31, whereby the power distribution becomes substantially equal to the ideal state (FIG. 2A). Therefore, compared with the comparative example of FIG. 4A, the rotary speed of the upper rotary body is suppressed to achieve the good speed matching between the rotation and the boom.

FIG. 4C illustrates a power distribution when the control is performed by the second control unit in addition to the control of the first control unit. As shown in FIG. 4C, when the control is performed by the second control unit, the load of the hydraulic pump 3 is further restricted. Therefore, the engine 2 outputs the power of 85 kW and the hydraulic pump 3 takes the power of 70 kW in the power of 85 kW. Similarly to FIG. 4B, as a result of the control of the first control unit, the total power of 30 kW is supplied to the rotation generator motor, 11, and the torque (100 N·m) corresponding to the current discharge pressure Pp (200 kg/cm$^2$) of the hydraulic pump 3 or the current load pressure of the boom hydraulic cylinder 31 is generated in the rotation generator motor 11. The power of 30 kW is distributed to the rotation generator motor 11 while the power of 70 kW is distributed to the boom hydraulic actuator 31, and the power distribution becomes identical to the ideal state (FIG. 2A). Therefore, the speed matching between the rotation and the boom becomes the ideal state.

As shown in FIG. 6, unless the control is performed by the second control unit so as to restrict the load of the hydraulic pump 3, a stroke speed V' of the boom hydraulic cylinder 31 is not gradually lowered as time of the hoist rotary work elapses (but the stroke speed V' becomes constant or is slightly increased), and the matching between the rotary speed U of the upper rotary body and the stroke speed V' of the boom hydraulic cylinder 31 drops slightly out from the ideal state. Because the boom lifting speed is not decreased despite the operator's intention to stop the boom lifting in a last half of the hoist rotary work, the operator feels uncomfortable feeling in the operation.

On the other hand, as shown in FIG. 5, when the control is performed by the second control unit so as to restrict the load of the hydraulic pump 3, the stroke speed V of the boom hydraulic cylinder 31 is gradually lowered as time of the hoist rotary work elapses because the pump load is restricted as described above, and the matching between the rotary speed U of the upper rotary body and the stroke speed V of the boom hydraulic cylinder 31 becomes the ideal state. Because the boom lifting speed is decreased in line with the operator's intention to stop the boom lifting in the last half of the hoist rotary work, and the operator does not feel the uncomfortable feeling in the operation.

When the control is performed by the first control unit, as can be seen from the letter A in FIG. 7B and the letter A' in FIG. 7A, the rotary speed U of the upper rotary body is suppressed in comparison with the speed U' of the comparative example. When the control is performed by the second control unit, as can be seen from the letter B in FIG. 7B and the letter B' in FIG. 7A, the boom hydraulic cylinder stroke speed V is gradually decreased as the work makes the transition to the last half in comparison with the speed V' of the comparative example. Thus, according to the invention, the speed matching between the upper rotary body and the boom can be achieved to accurately perform the hoist rotary work with good operability.

BRIEF DESCRIPTION OF THE DRAWINGS

FIG. 13A is a diagram showing the changes of actuation speeds over time of the hydraulic actuator and electric actuator during the combined actuation;

FIG. 17A is a diagram showing the changes of actuation speeds over time of the hydraulic actuator and electric actuator during the combined actuation.

EXPLANATIONS OF LETTERS OR NUMERALS

Figure 1:
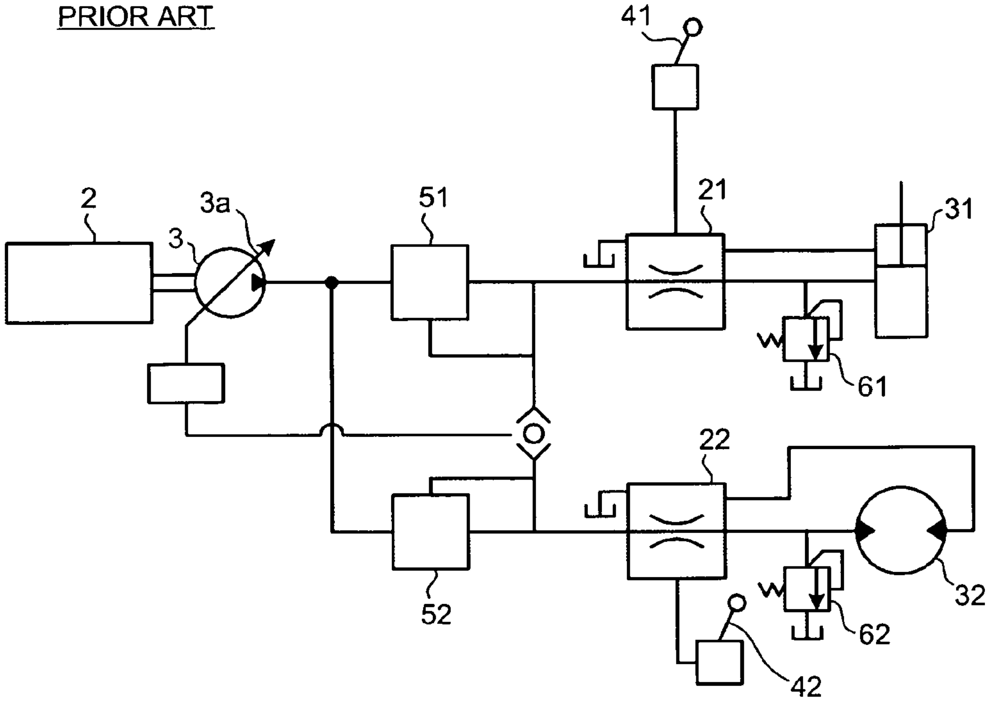
FIG.1 PRIOR ART
FIG. 1 is a hydraulic circuit diagram showing a configuration example of a conventional hydraulic shovel.

2 engine
3 hydraulic pump
4 generator motor
7 hybrid controller
11 rotation generator motor
17 engine pump controller
31, 33, 34, 35, 36 hydraulic actuator
41, 42 control lever
71, 72 determination unit

BEST MODES FOR CARRYING OUT THE INVENTION

Figure 3:
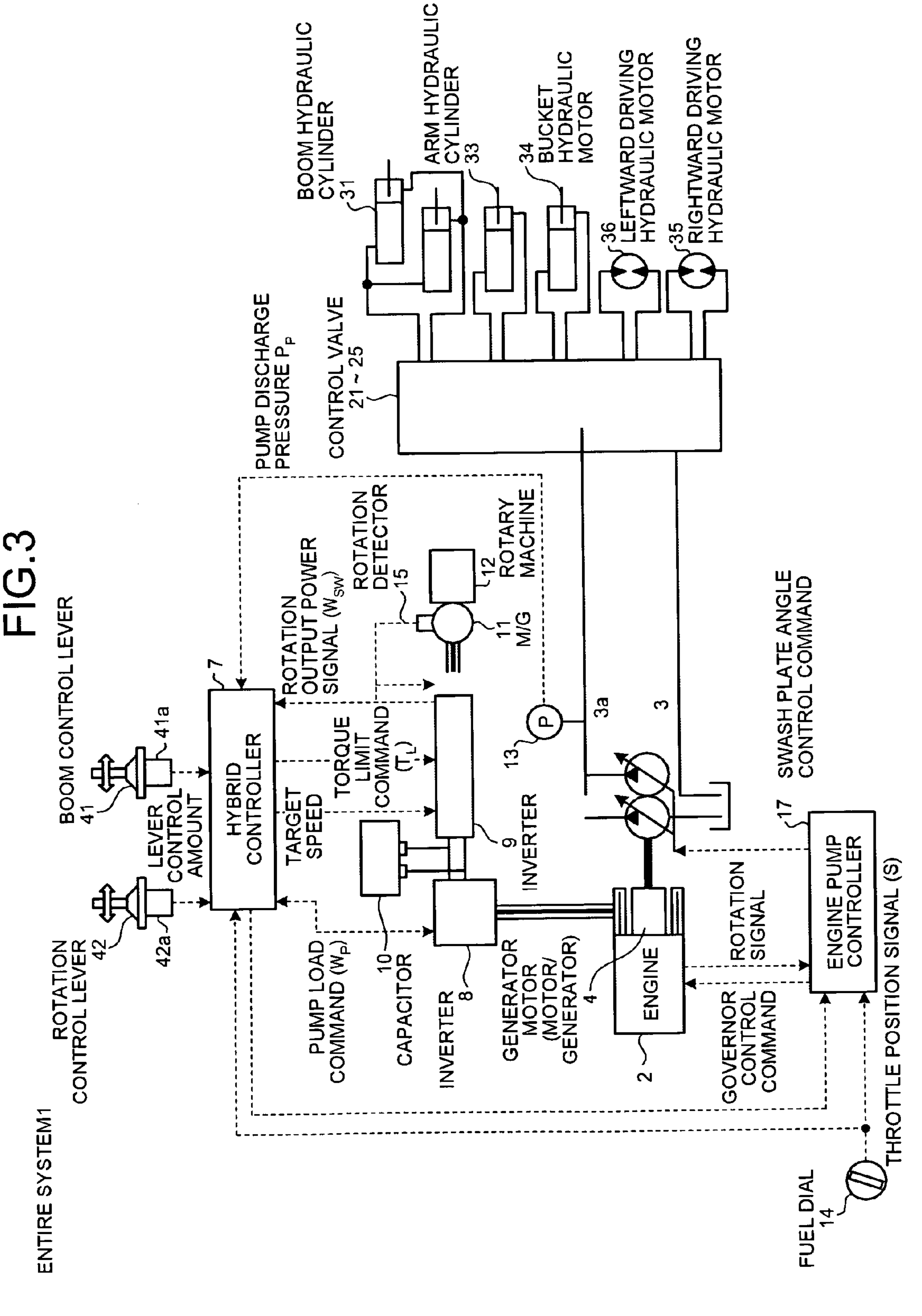
FIG. 3 is a diagram showing a configuration of a hydraulic shovel according to an embodiment of the invention.

Embodiments of the invention will be described below with reference to the drawings. FIG. 3 shows an overall configuration of a construction machine 1 according to an embodiment of the invention. The construction machine 1 is intended to be a hydraulic shovel.

The construction machine 1 includes an upper rotary body and a lower crawler carrier, and the lower crawler carrier includes right and left crawler tracks. A work machine including a boom, an arm, and a bucket is attached to a machine body. The boom is actuated by driving a boom hydraulic cylinder 31, the arm is actuated by driving an arm hydraulic cylinder 33 (hereinafter, sometimes referred to as "an arm hydraulic actuator 33"), and the bucket is actuated by driving a bucket hydraulic cylinder 34 (hereinafter, sometimes referred to as "a bucket hydraulic actuator 34"). The left crawler track and the right crawler track are rotated by driving a left-crawler hydraulic motor 35 and a right-crawler hydraulic motor 36 respectively.

When a rotary machine 12 is driven, the upper rotary body is rotated through a swing pinion, a swing circle, or the like. The hydraulic pump 3 formed in a tandem pump is connected to the output shaft of the engine 2, and the hydraulic pump 3 is driven by rotation of the engine output shaft. The hydraulic pump 3 is a variable displacement hydraulic pump in which the inclination angle of a swash plate 3*a* is changed to change the volume q (cc/rev).

The pressurized oil discharged from the hydraulic pump 3 at the discharge pressure Pp and the flow rate Q (cc/min) is supplied to a boom control valve 21, an arm control valve 22, a bucket control valve 23, a left-crawler control valve 24, and a right-crawler control valve 25 respectively. A hydraulic sensor 13 detects the discharge pressure Pp of the hydraulic pump 3, and a signal indicating the pump discharge pressure Pp is input to a hybrid controller 7.

The pressurized oil output from the boom control valve 21, the arm control valve 22, the bucket control valve 23, the left-crawler control valve 24, and the right-crawler control valve 25 is supplied to the boom hydraulic cylinder 31, the arm hydraulic cylinder 33, the bucket hydraulic cylinder 34, the left-crawler hydraulic motor 35, and the right-crawler hydraulic motor 36, respectively. This enables the boom, the arm, the bucket, the left crawler track, and the right crawler track to be actuated by driving the boom hydraulic cylinder 31, the arm hydraulic cylinder 33, the bucket hydraulic cylinder 34, the left-crawler hydraulic motor 35, and the right-crawler hydraulic motor 36 respectively.

Control levers are provided in a driver seat of the construction machine 1 to actuate the work machine, lower crawler carrier, and upper rotary body. The boom control lever 41 for actuating the boom and the rotary control lever 42 for actuating the upper rotary body are typically shown in FIG. 2.

Sensors 41*a* and 42*a* are provided in the boom control lever 41 and the rotary control lever 42 to detect controlled variables (controlled position). The signals detected by the sensors 41*a* and 42*a* are input to the hybrid controller 7.

The engine 2 is a diesel engine in which the power (output, horse power; kw) is controlled by adjusting the fuel amount injected into the cylinder. The adjustment is performed by controlling a governor attached to a fuel injection pump of the engine 2.

A signal indicating a throttle position S (%) set by a fuel dial 14 and a signal indicating an engine speed of the engine 2 are input to the engine pump controller 17. The throttle position S is expressed in unit of % while the maximum engine speed (high idle engine speed) of the engine 2 is set to 100%. The signal indicating the throttle position S set by the fuel dial 14 is input to the hybrid controller 7 and the engine pump controller 17.

The engine pump controller 17 issues a governor control command for setting the engine speed to a target engine speed based on the target engine speed corresponding to the throttle position S and the currently actual engine speed, and the governor increases or decreases the fuel injection amount in response to the governor control command such that the target engine speed is obtained.

The control of the engine pump controller 17 for the engine 2 and the pump 3 is generally divided into a heavy excavation mode (work mode in the high-load state of the work machine) and a normal excavation mode. In the heavy excavation mode, the pump load is increased, and the engine speed is decreased when the pressure increases. At this point, the engine pump controller 17 decreases the pump discharge amount such that the engine speed becomes close to a predetermined output point. On the contrary, when the pressure is lowered, the engine pump controller 17 increases the pump discharge amount such that the engine speed becomes close to the predetermined output point. In the normal excavation mode, the pump load is increased, and the engine speed is lowered when the pressure is increased. At this point, the engine pump controller 17 controls the pump load such that the engine speed is decreased while the torque is kept constant along a constant-horse power curve of the engine 2 through the combined control on both the sides of the engine 2 and the pump 3. Therefore, the engine 2 can be used in a good fuel-efficiency range.

A generator motor (motor/generator) 4 is coupled to the output shaft of the engine 2. For example, the drive shaft of the generator motor 4 is coupled to the engine output shaft through a gear. The generator motor 4 performs power a generation action and a motor action. That is, the generator motor 4 is actuated as a motor and also actuated as a generator.

The torque of the generator motor 4 is controlled by an inverter 8. The inverter 8 controls the torque of the generator motor 4 in response to a torque command generated by the hybrid controller 7. A rotation generator motor 11 is coupled to the drive shaft of the rotary machine 12.

The rotation generator motor 11 performs a power generation and a rotational force generation. That is, the rotation generator motor 11 is actuated as the motor and also actuated as the generator. The torque of the upper rotary body is taken to generate the electric power when the upper rotary body is stopped.

A rotational speed or a torque of the rotation generator motor 11 is controlled by the inverter 9. The inverter 9 controls the rotational speed of the rotation generator motor 11 in response to a target speed command sent from the hybrid controller 7. The rotational speed of the rotation generator motor 11 is detected by a rotation detector 15, and the inverter 9 controls the rotation generator motor 11 such that a deviation is eliminated between the target speed and the detected rotational speed.

A signal indicating the torque and the rotational speed generated in the rotation generator motor 11 is input to the hybrid controller 7 as a signal indicating a current output power of the upper rotary body. The hybrid controller 7 computes the current output power (rotary output power) Wsw of the upper rotary body based on the torque and the rotational speed of the rotation generator motor 11.

The hybrid controller 7 generates a pump load command and outputs the pump load command to the engine pump controller 17 based on the current rotary output power Wsw and the current throttle position S set by the fuel dial 14. The pump load command is used to restrict a load Wp of the hydraulic pump 3.

The hybrid controller 7 generates a torque limit command and outputs the torque limit command to the inverter 9 based on the controlled variables of the boom control lever 41 and the rotation control lever 42 and the pump discharge pressure Pp. The torque limit command is for restricting the torque generated in the rotation generator motor 11.

When the hybrid controller 7 outputs the torque limit command, the inverter 9 controls the torque of the generator motor 11 such that the torque generated in the rotation generator motor 11 is the torque limit value TL or less.

The inverter 8 and the inverter 9 are electrically connected to a storage device 10 through a direct-current power supply line, and the inverter 8 and the inverter 9 are electrically connected to each other through the direct-current power supply line. The controllers 7 and 17 are activated by the storage device 10 which is a power supply.

The storage device 10 includes a capacitor or a storage battery, and the storage device 10 accumulates (charge up) the electric power when the generator motor 4 and the rotation generator motor 11 perform the power generation. The storage device 10 supplies the accumulated electric power to the inverter 8 and inverter 9. As used herein, the term "storage device" shall include storage batteries such as a capacitor, a lead storage battery, a nickel-hydrogen battery, and a lithium-ion battery, in which the electric power is stored in the form of electrostatic charges.

The operation in which the generator motor 4 is actuated as the generator will be described below. A part of the output torque generated by the engine 2 is transmitted to the drive shaft of the generator motor 4 through the engine output shaft, and is taken to generate the electric power. The alternating-current power generated by the generator motor 4 is converted into the direct-current power by the inverter 8, and the electric power is accumulated in the storage device 10 through the direct-current power supply line. Alternatively, the alternating-current power generated by the generator motor 4 is converted into the direct-current power by the inverter 8 and directly supplied to the inverter 9 through the direct-current power supply line.

The operation in which the generator motor 4 is actuated as the motor will be described below. The storage device 10 outputs the electric power, the inverter 8 converts the direct-current power accumulated in the storage device 10 into the alternating-current power, and the alternating-current power is supplied to the generator motor 4 to rotate the drive shaft of the generator motor 4. Alternatively, the direct-current power supplied from the inverter 9 is converted into the alternating-current power by the inverter 8, and the alternating-current power is supplied to the generator motor 4 to rotate the drive shaft of the generator motor 4. Therefore, the torque is generated in the generator motor 4, and the torque is transmitted to the engine output shaft through the driving shaft of the generator motor 4 and added to the output torque of the engine 2 (engine output is assisted). The added output torque is used by the hydraulic pump 3.

The operation in which the rotation generator motor 11 is actuated as the motor will be described below. The rotation generator motor 11 is driven by the electric power generated by the generator motor 4 and/or the electric power accumulated in the storage device 10. Therefore, the direct-current power accumulated in the storage device 10 and/or the direct-current power supplied from the inverter 8 are converted into the alternating-current power by the inverter 9 and supplied to the rotation generator motor 11, and the alternating-current power rotates the drive shaft of the rotary machine 12 and the upper rotary body.

The operation in which the rotation generator motor 11 is actuated as the generator will be described below. When the upper rotary body is stopped, the torque generated by the rotary machine 12 is transmitted to and taken in the drive shaft of the rotation generator motor 11 to generate the electric power. The alternating-current power generated by the rotation generator motor 11 is converted into the direct-current power by the inverter 9, and the electric power is accumulated in the storage device 10 through the direct-current power supply line. Alternatively, the alternating-current power generated by the rotation generator motor 11 is converted into the direct-current power by the inverter 9 and supplied to the inverter 8 through the direct-current power supply line.

The engine pump controller 17 determines the pump load torque based on the pump load Wp and the engine speed, and the engine pump controller 17 controls the inclination angle of the swash plate 3*a* of the hydraulic pump 3 such that a product of the discharge pressure Pp of the hydraulic pump 3 and the volume q of the hydraulic pump 3 does not exceed the pump torque.

Contents of the control performed by the hybrid controller 7 will be described with reference to FIG. 5. In the embodiment, a first control and a second control are performed.

(First Control)

The determination units 71 and 72 determine whether or not the boom hydraulic cylinder 31 and the rotation generator motor 11 are concurrently actuated based on the controlled variable of the boom control lever 41 and the controlled variable of the rotation control lever 42. Therefore, the determination units 71 and 72 determine whether or not the hoist rotary work is performed. In the hoist rotary work, the rotation generator motor 11 actuates the upper rotary body so as to rotate the upper rotary body while the boom hydraulic actuator 31 actuates the boom upward.

When the determination units 71 and 72 determine that the boom hydraulic cylinder 31 and the rotation generator motor 11 are concurrently actuated, the switching unit 73 generates and outputs the torque limit command for restricting the torque of the rotation generator motor 11 based on the pump discharge pressure Pp. The torque limit command is generated and output such that the torque limit value TL of the rotation generator motor 11 decreases with a decrease in discharge pressure Pp of the hydraulic pump 3.

That is, the determination unit 71 determines whether or not the rotation control lever 42 is located at the neutral position (whether or not the rotation control lever 42 is controlled) based on the controlled variable of the rotation control lever 42. The determination unit 72 determines whether or not the control lever 41 is operated by 50% or more in an upward direction based on the controlled variable of the boom control lever 41.

In the case where at least one of the determination results of the determination units 71 and 72 becomes negative, the determination units 71 and 72 determine that the hoist rotary work is not performed, and the switching unit 73 is switched to a NO side. Therefore, the torque limit command in which the normal torque limit value TL1 is set to the torque limit TL is outputted to the inverter 9 through the switching unit 73.

On the other hand, in the case where both the determination results of the determination units 71 and 72 become positive, the determination units 71 and 72 determine that the hoist rotary work is performed, and the switching unit 73 is switched to a YES side. Therefore, the torque limit command in which the torque limit value TL2 is set to the torque limit TL for a hoist rotation is outputted to the inverter 9 through the switching unit 73.

The torque limit value TL2 for the hoist rotation can be determined by the following equation (1).

$$TL2=(Pp/Prf)\cdot TL1\cdot K1 \quad (1)$$

where

Pp: pump discharge pressure

Prf: pump discharge pressure limit value

TL1: normal torque limit value

K1: correction factor

The pump discharge pressure limit value Prf corresponds to the relief pressure of the rotation relief valve 62 in the hydraulic circuit of FIG. 1. For example, the pump discharge pressure limit value Prf is set to 270 kg/cm$^2$.

The normal torque limit value TL1 is obtained by the conversion of the pump discharge pressure limit value Prf into the torque. For example, the torque limit value TL1 is set to a torque value (135 N·m) corresponding to the pump discharge pressure limit value Prf (270 kg/cm$^2$).

As shown in the equation (1), the torque limit value TL2 is computed such that the torque limit value of the rotation generator motor 11 decreases with a decrease in discharge pressure Pp of the hydraulic pump 3.

At this point, the pump discharge pressure Pp and the pump discharge pressure limit value Prf are used in the equation (1).

Alternatively, the load pressure of the boom hydraulic cylinder 31 and the load pressure limit value of the boom hydraulic cylinder 31 may be used in the equation (1).

During the hoist rotary work, the hybrid controller 7 controls the rotation generator motor 11 through the inverter 9 such that the torque generated by the rotation generator motor 11 does not exceed the computed torque limit value TL2.

(Second Control)

In the hybrid controller 7, the pump load command for restricting the load Wp of the hydraulic pump 3 is generated based on the rotary output power Wsw and the throttle position S such that the load Wp of the hydraulic pump 3 decreases with an increase in rotary output power Wsw, and the pump load command is output to the engine pump controller 17.

The pump load Wp can be determined by the following equation (2).

$$Wp=S\cdot Pe-Wsw\cdot K2 \qquad (2)$$

where

S: throttle position

Pe: engine maximum output power

Wsw: rotation output power

K2: correction factor

The right side expression S·Pe of the equation (2) indicates the maximum engine output power at the current engine speed.

As shown in the equation (2), when the hydraulic pump load Wp is computed such that the load Wp of the hydraulic pump 3 decreases with an increase in rotation output power Wsw, the engine pump controller 17 controls the inclination angle of the swash plate 3*a* of the hydraulic pump 3 such that the pump load of the hydraulic pump 3 does not exceed the computed pump load Wp.

Figure 4A:
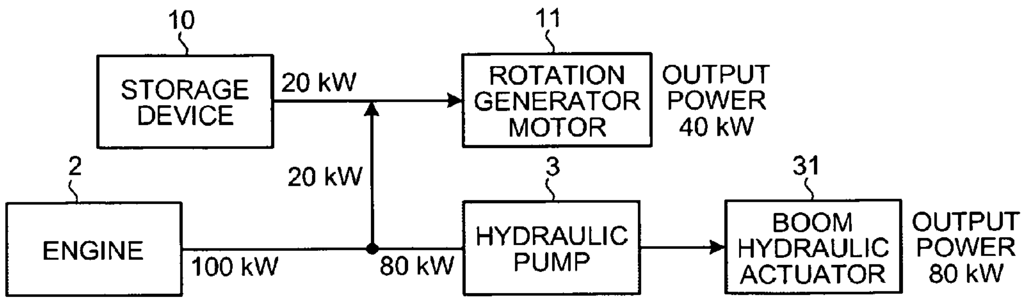
FIG. 4A is a diagram illustrating a power distribution in a hydraulic shovel including a hydraulic actuator and an electric actuator.

The advantages of the control of the embodiment will be described below with reference to FIGS. 4A, 4B, and 4C. FIG. 4A shows a comparative example illustrating the power distribution when the first control and the second control are not performed.

Figure 2A:
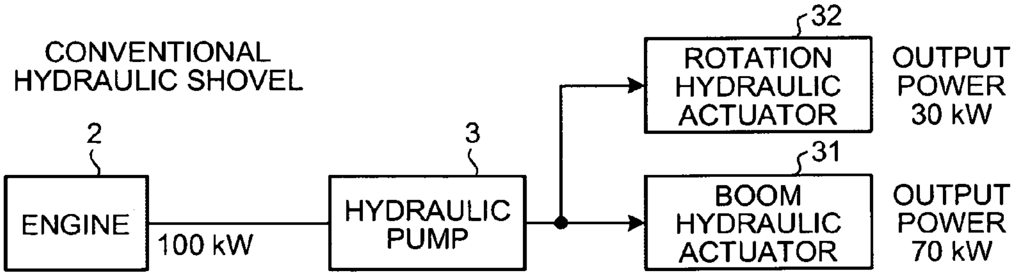
FIG. 2A is a diagram illustrating a power distribution in a hydraulic shovel including a hydraulic actuator.
Figure 2B:
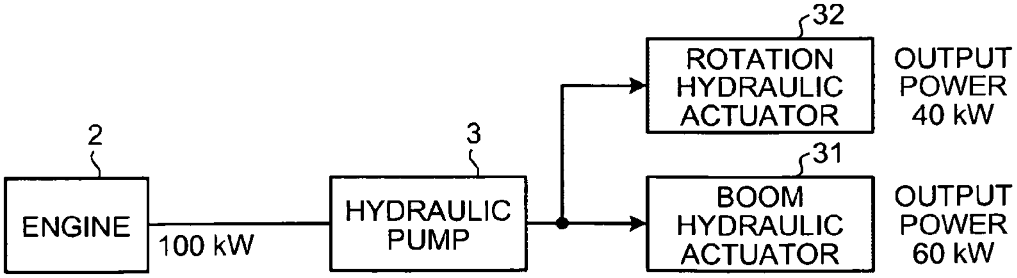
FIG. 2B is a diagram illustrating a power distribution in a hydraulic shovel including a hydraulic actuator.

As shown in FIG. 4A, the power of 20 kW is supplied to the rotation generator motor 11 from the storage device 10, and the power of 20 kW is supplied to the rotation generator motor 11 from the engine 2 which outputs the power of 100 kW. Therefore, the total power of 40 kW is supplied to the rotation generator motor 11, and the torque (135 N·m) corresponding to the relief pressure Prf (270, kg/cm$^2$) of the rotation relief valve 62 is generated in the rotation generator motor 11. Because the power of 40 kW is distributed to the rotation generator motor 11 while the power of 80 kW is distributed to the boom hydraulic actuator 31, the power distribution departs largely from the ideal state (FIG. 2A). Therefore, the rotary speed of the upper rotary body becomes faster compared with the boom lifting speed, which deteriorates the speed matching between the upper rotary body and the boom.

Figure 4B:
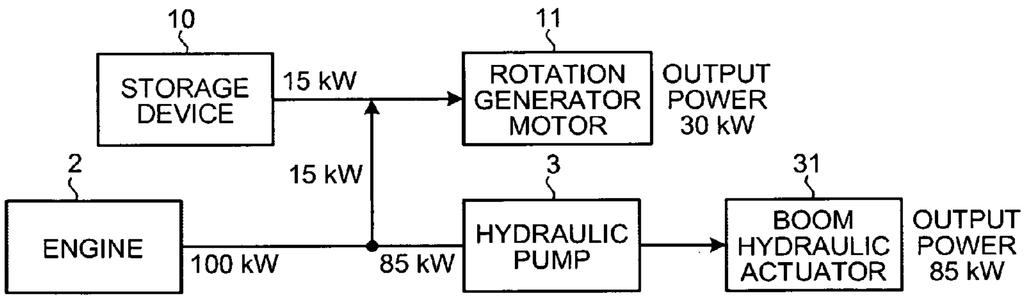
FIG. 4B is a diagram illustrating a power distribution in a hydraulic shovel including a hydraulic actuator and an electric actuator.

On the other hand, FIG. 4B illustrates the power distribution in the case where the first control is performed. As shown in FIG. 4B, the torque generated by the rotation generator motor 11 is restricted by the first control, whereby the power of 15 kW is supplied to the rotation generator motor 11 from the storage device 10 while the power of 15 kW is supplied to the rotation generator motor 11 from the engine 2 which outputs the power of 100 kW. Therefore, the total power of 30 kW is supplied to the rotation generator motor 11, and the current discharge pressure Pp (200 kg/cm$^2$) of the hydraulic pump 3 or the torque (100 N·m) corresponding to the current load pressure of the boom hydraulic cylinder 31 is generated in the rotation generator motor 11. Because the power of 30 kW is distributed to the rotation generator motor 11 while the power of 85 kW is distributed to the boom hydraulic actuator 31, the power distribution becomes substantially identical to the ideal state (FIG. 2A). The rotary speed of the upper rotary body is suppressed compared with the comparative example of FIG. 4A, which achieves the good speed matching between the upper rotary body and the boom.

Figure 4C:
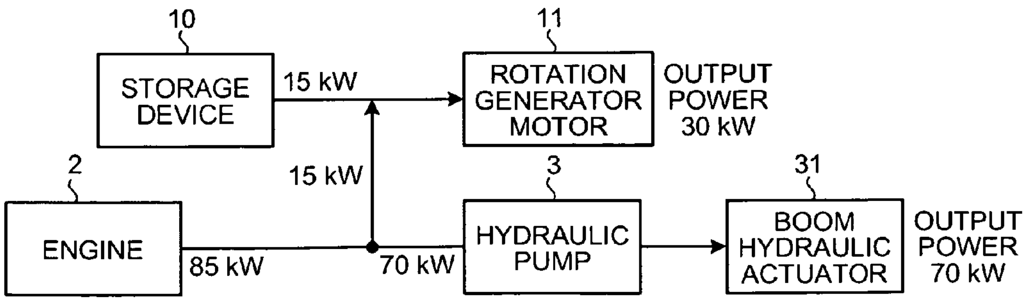
FIG. 4C is a diagram illustrating a power distribution in a hydraulic shovel including a hydraulic actuator and an electric actuator.

On the other hand, FIG. 4C illustrates the power distribution in the case where the second control is performed in addition to the first control. As shown in FIG. 4C, the load of the hydraulic pump 3 is further restricted by the second control, whereby the engine 2 outputs the power of 85 kW, and the power of 70 kW is distributed to the hydraulic pump 3. Similarly to FIG. 4B, as a result of the first control, the total power of 30 kW is supplied to the rotation generator motor 11, and the current discharge pressure Pp (200 kg/cm$^2$) of the hydraulic pump 3 or the torque (100 N·m) corresponding the current load pressure of the boom hydraulic cylinder 31 is generated in the rotation generator motor 11. Because the power of 30 kW is distributed to the rotation generator motor 11 while the power of 70 kW is distributed to the boom hydraulic actuator 31, the power distribution becomes identical to the ideal state (FIG. 2A), and the speed matching between the upper rotary body and the boom becomes the ideal state.

Figure 6:
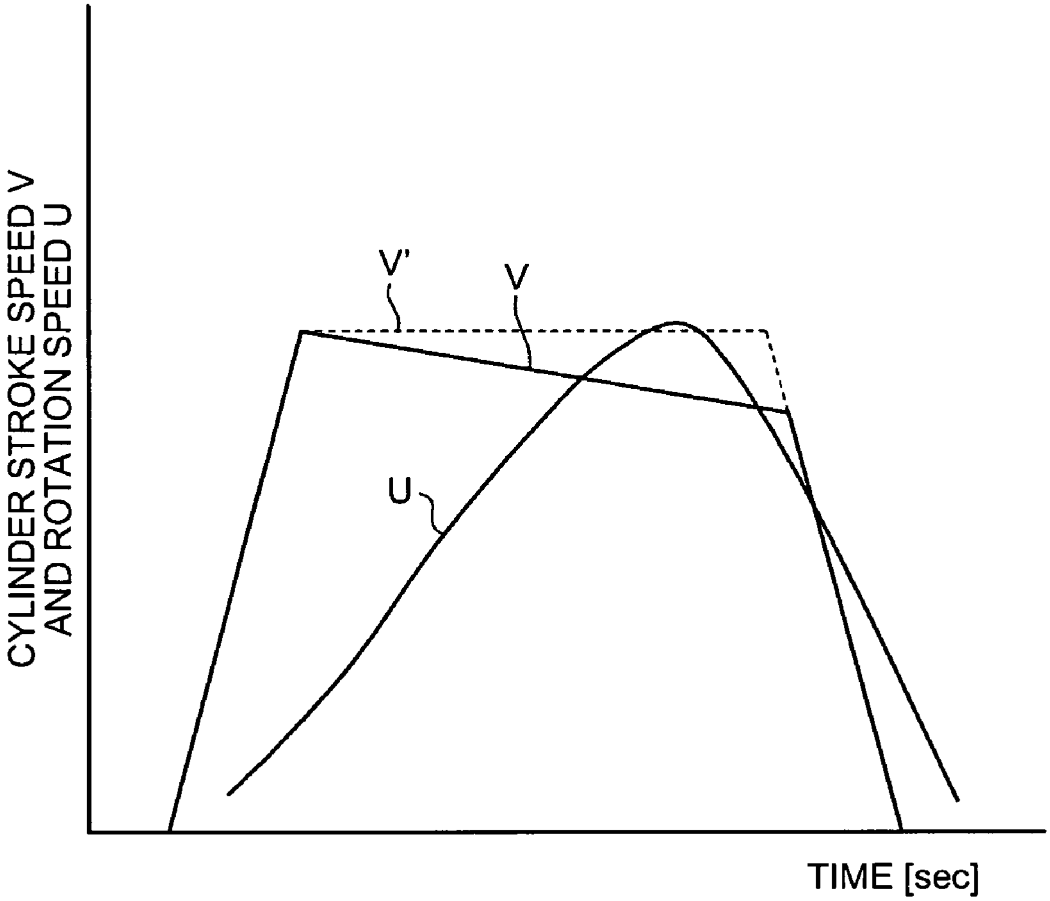
FIG. 6 is a diagram showing changes of speeds over time of the hydraulic actuator and electric actuator during combined actuation.

FIG. 6 shows a change of a stroke speed V (cm/sec) of the boom hydraulic cylinder 31 over time during the hoist rotary work and a change of a rotary speed U (rpm) of the upper rotary body over time during the hoist rotary work. In FIG. 6, a broken line indicates a hydraulic cylinder stroke speed V' in the case where the second control is not performed (the load of the hydraulic pump 3 is not restricted), and a solid line indicates the hydraulic cylinder stroke speed V in the case where the second control is performed (the load of the hydraulic pump 3 is restricted).

In the case where the second control in which the load of the hydraulic pump 3 is restricted is not performed, the stroke speed V' of the boom hydraulic cylinder 31 is not gradually lowered with a progress of the hoist rotary work (but the stroke speed V' becomes constant or is slightly increased), and the matching between the rotary speed U of the upper rotary body and the stroke speed V' of the boom hydraulic cylinder 31 departs slightly from the ideal state. Because the boom lifting speed is not decreased despite of the operator's intention to stop the boom lifting in the last half of the hoist rotary work, the operator feels the uncomfortable feeling in the operation.

On the other hand, in the case where the second control is performed to restrict the load power of the hydraulic pump 3, the stroke speed V of the boom hydraulic cylinder 31 is gradually lowered as the hoist rotary work progresses, and the matching between the rotary speed U of the upper rotary body and the stroke speed V of the boom hydraulic cylinder 31 becomes the ideal state. Because the boom lifting speed is decreased in line with the operator's intention to stop the boom lifting in the last half of the hoist rotary work, and the operator does not feel the uncomfortable feeling in the operation, and the operability is improved.

Figure 7A:
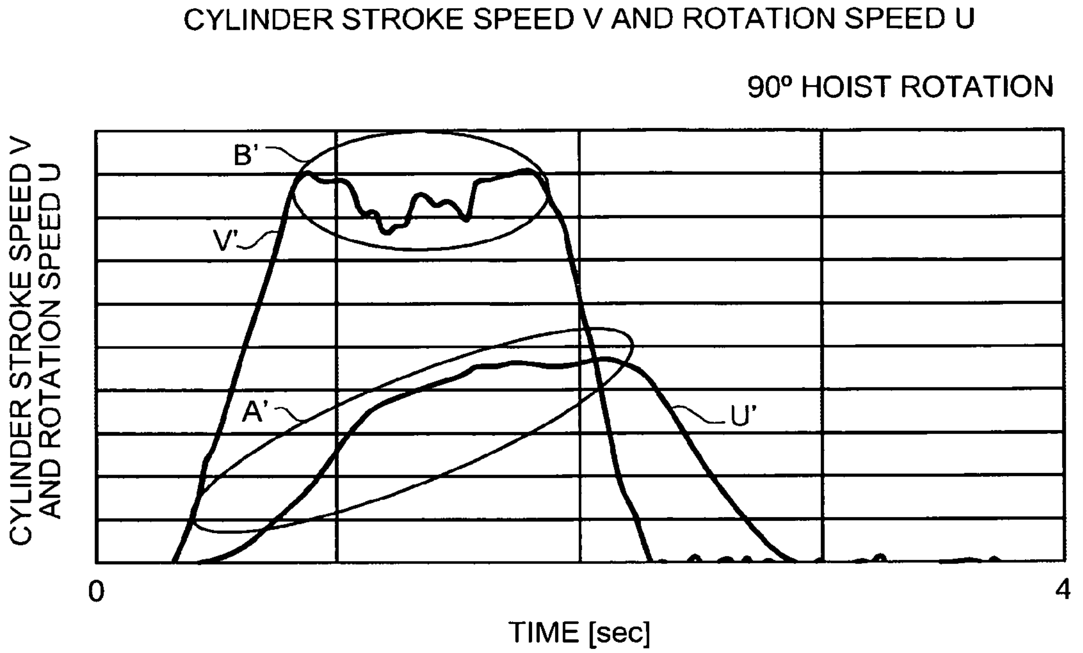
FIG. 7A is a diagram showing a comparative example corresponding to the embodiment of FIG. 5, and is a diagram showing the changes of speeds over time of the hydraulic actuator and electric actuator during the combined actuation.
Figure 7B:
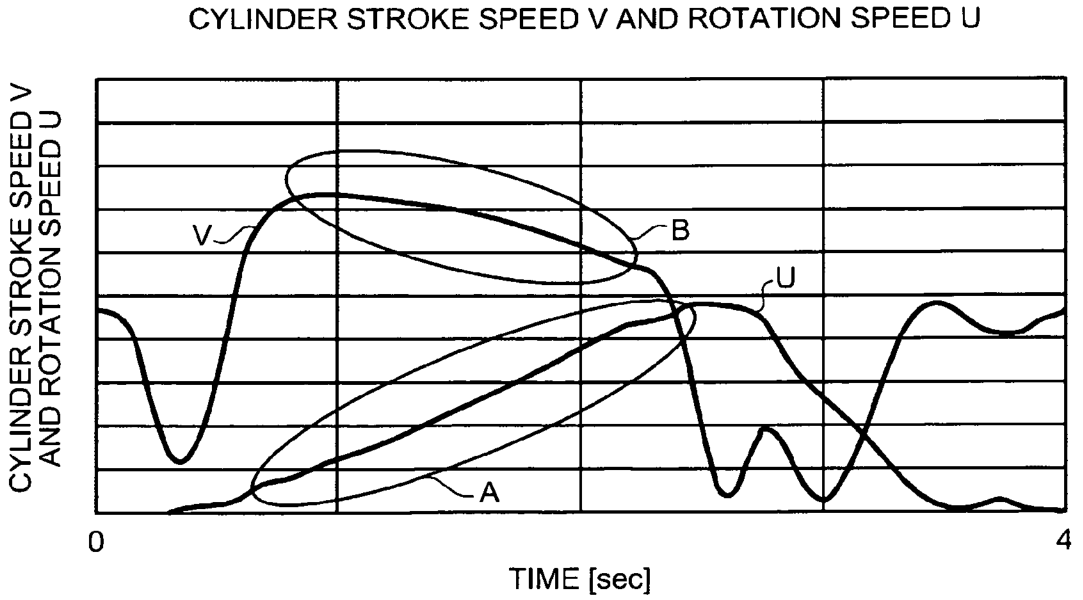
FIG. 7B is a diagram showing the changes of speeds over time of the hydraulic actuator and electric actuator during the combined actuation in the embodiment of FIG. 5.

Similarly to FIG. 6, FIGS. 7A and 7B show the change of the stroke speed V (cm/sec) of the boom hydraulic cylinder 31 over time during the hoist rotary work and the change of the rotary speed U (rpm) of the upper rotary body over time during the hoist rotary work. FIG. 7B shows the embodiment (the first control and second control are performed, the power distribution of FIG. 4C), and FIG. 7A shows the comparative example (power distribution of FIG. 4A).

When the first control is performed, as indicated by the letter A in FIG. 7B and the letter A' in FIG. 7A, the rotary speed U of the upper rotary body is suppressed in comparison with the speed U' of the comparative example. When the second control is performed, as indicated by the letter B in FIG. 7B and the letter B' in FIG. 7A, the boom hydraulic cylinder stroke speed V is gradually decreased as the work makes the transition to the last half in comparison with the speed V' of the comparative example. Thus, according to the embodiment, the speed matching between the upper rotary body and the boom can be achieved to accurately perform the hoist rotary work with good operability.

Various modifications of the embodiment can be made. In the embodiment, both the first control and the second control are performed. However, in the invention, it is not always necessary to simultaneously perform both the first control and the second control. Alternatively, only one of the first control and the second control may be performed.

In the invention, the first control may be applied to actuation of a combination of a hydraulic actuator and a electric actuator, and the actuators can be applied to any controlled objects. Therefore, the invention is not limited to hydraulic actuator actuating the boom and the electric actuator actuating the upper rotary body.

The equation (1) used in the first control and the equation (2) used in the second control are shown by way of example. Obviously the torque limit value and the pump load can be computed based on equations other than the equations (1) and (2)

Although the torque of the rotation generator motor 11 is restricted in the first control, the speed of the rotation generator motor 11 may be restricted instead of the torque.

Figure 5:
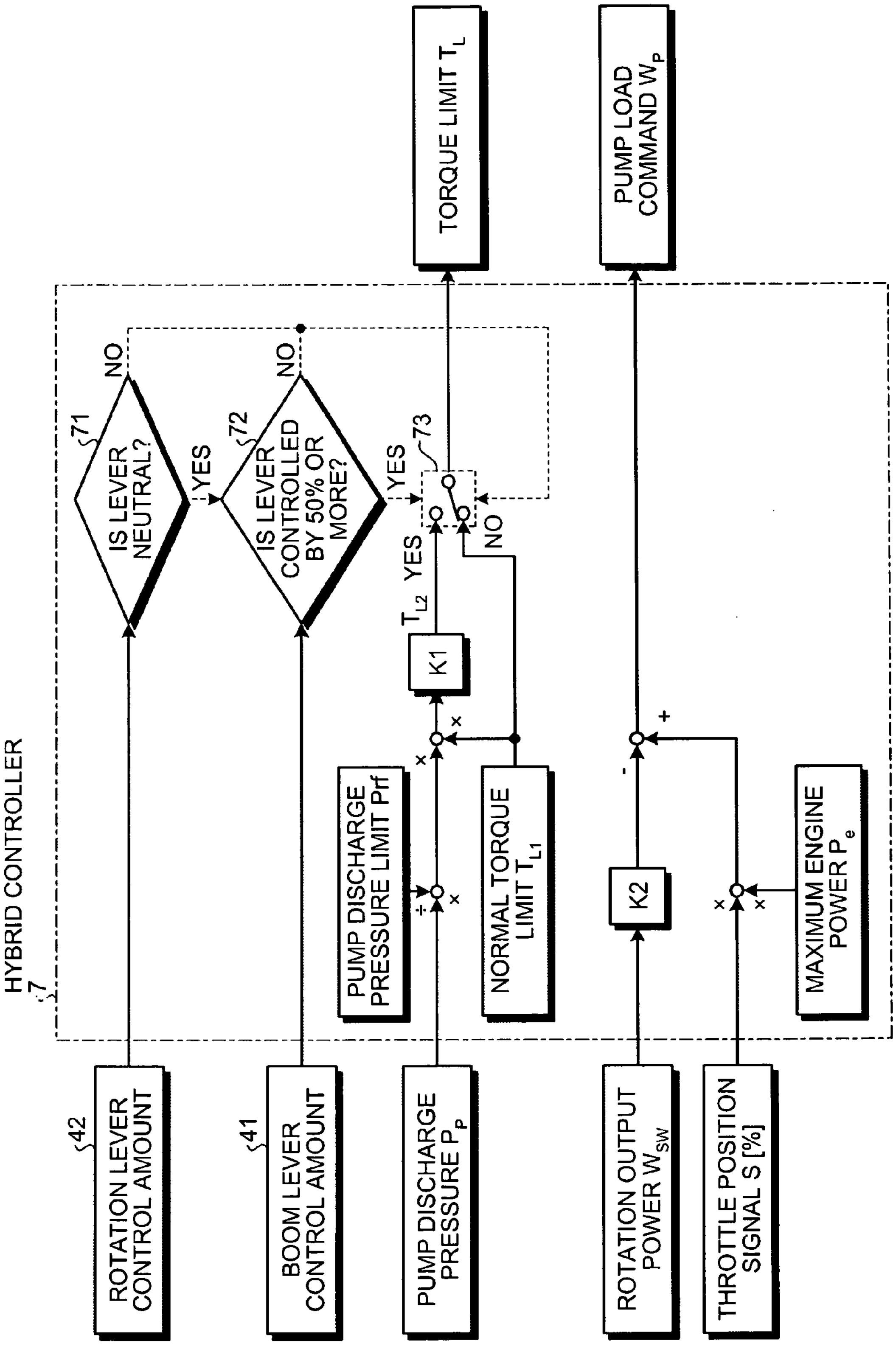
FIG. 5 is a diagram showing a control block according to an embodiment of the invention.
Figure 8:
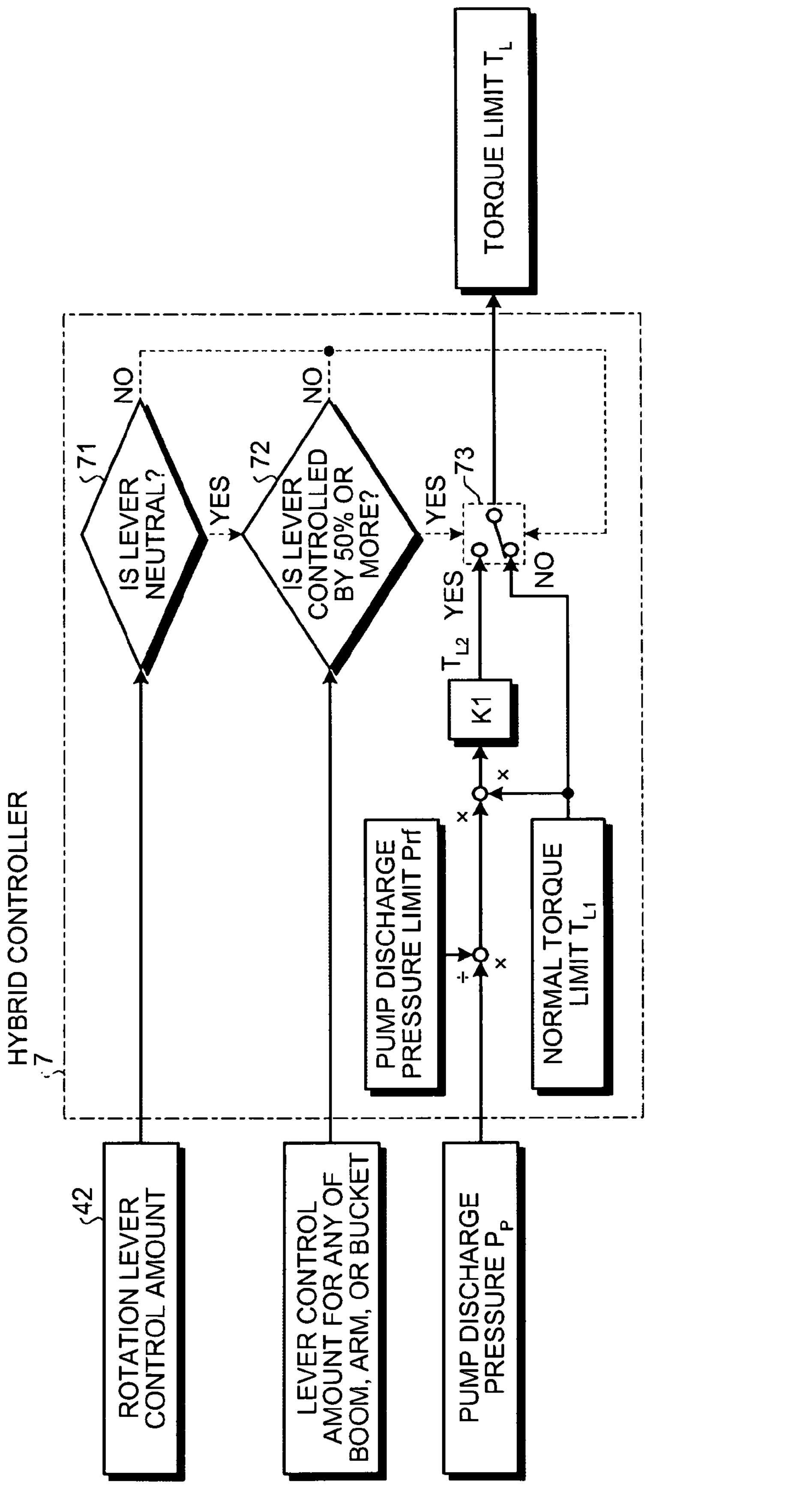
FIG. 8 is a diagram showing a control block according to another embodiment of the invention.

FIG. 8 corresponds to FIG. 5, and FIG. 8 shows another embodiment in which only the first control is performed by the hybrid controller 7. As shown in FIG. 8, in the embodiment, the first control is performed when the controlled variable of the control lever, which is one of the controlled variables of the boom control lever, the arm control lever, and the bucket control lever, is controlled by 50% or more.

Figure 9A:
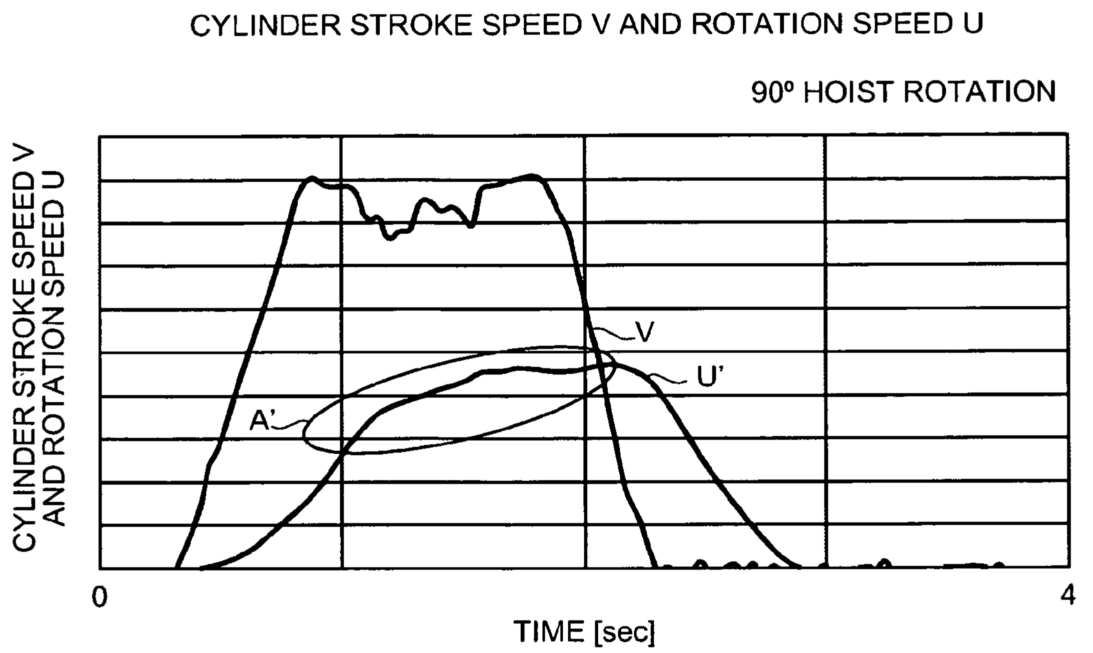
FIG. 9A is a diagram showing a comparative example corresponding to the embodiment of FIG. 8, and is a diagram showing the changes of speeds over time of the hydraulic actuator and electric actuator during the combined actuation.
Figure 9B:
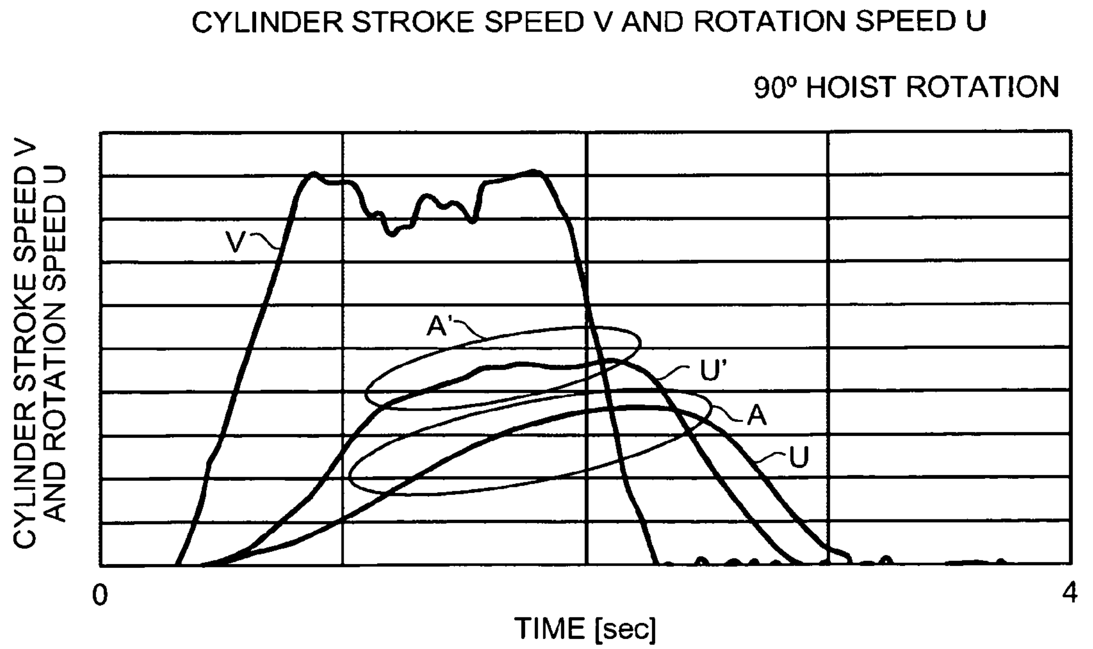
FIG. 9B is a diagram showing the changes of actuation speeds over time of the hydraulic actuator and electric actuator during the combined actuation in the embodiment of FIG. 8.

FIGS. 9A and 9B correspond to FIGS. 7A and 7B, and FIGS. 9A and 9B show the comparative example and the embodiment of FIG. 8 in comparison. According to the embodiment of FIG. 8, the first control is performed when determined that the upper rotary body and the work machine are concurrently actuated. Therefore, as indicated by the letter A of FIG. 9B and the letter A' of FIG. 9A, the rotary speed U of the upper rotary body is suppressed compared with the speed U' of the comparative example, thereby matching the speeds between the upper rotary body and the work machine.

Figure 10:
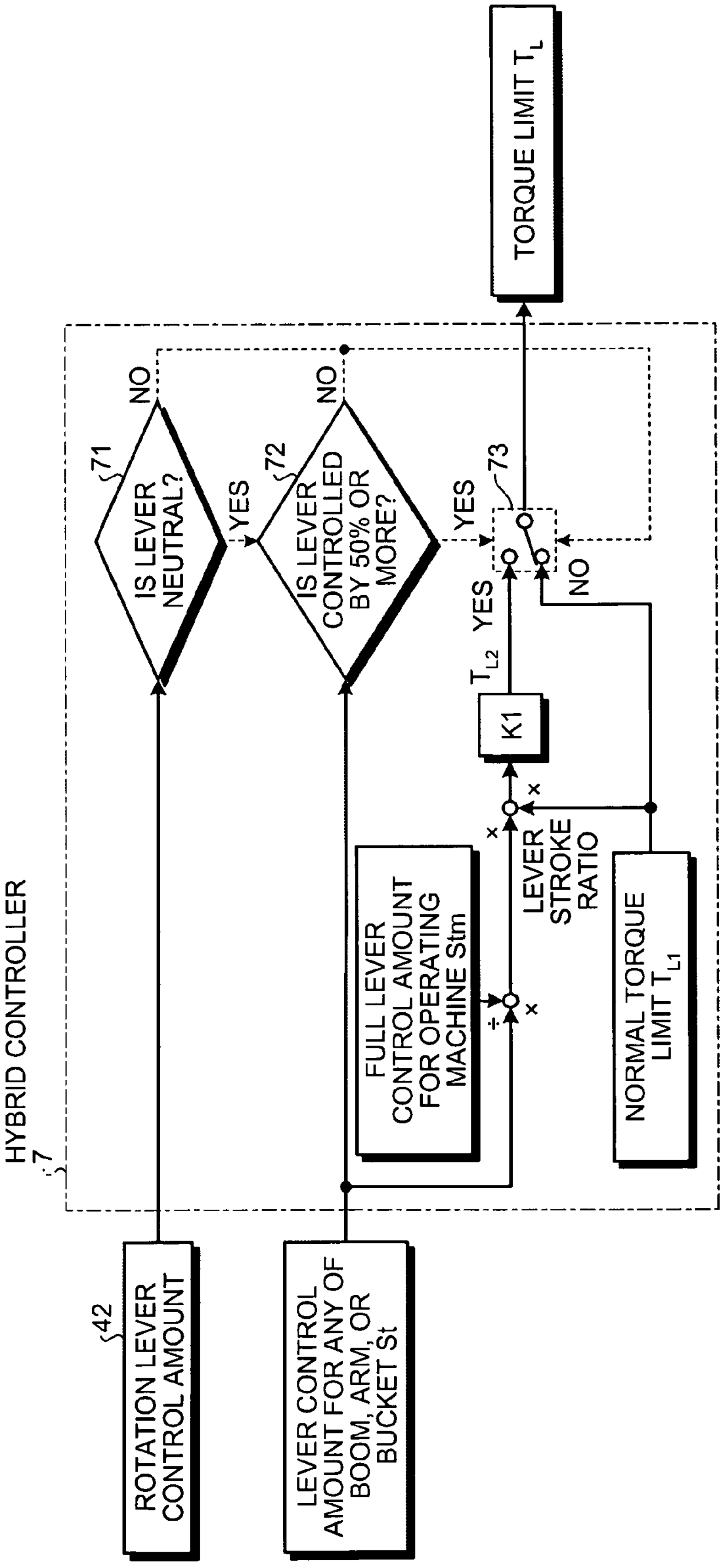
FIG. 10 is a diagram showing a control block according to another embodiment of the invention.

FIG. 10 corresponds to FIG. 5, and FIG. 10 shows another embodiment in which only the first control is performed by the hybrid controller 7. As shown in FIG. 10, in the embodiment, the first control is performed when the controlled variable of the control lever of the work machine which is largest among the controlled variables of the boom control lever, the arm control lever, and the bucket control lever is operated by 50% or more.

The torque limit value TL2 during the combined actuation is computed using the following equation (3) instead of the equation (1).

$$TL2=(St/Stm)\cdot TL1\cdot K1 \quad (3)$$

where

St: largest controlled variable in controlled variables of boom control lever, arm control lever, and bucket control lever Stm: maximum controlled variable (full lever position) of work machine control lever TL1: normal torque limit value K1: correction factor As shown in the equation (3), the controlled variable St of the work machine control lever is assumed to be the load on the hydraulic pump 3 or the work machine hydraulic actuators 31, 33, and 34, and the torque limit value TL2 is computed such that the torque limit value of the rotation generator motor 11 decreases with a decrease in controlled variable St of the work machine control lever.

Figure 11A:
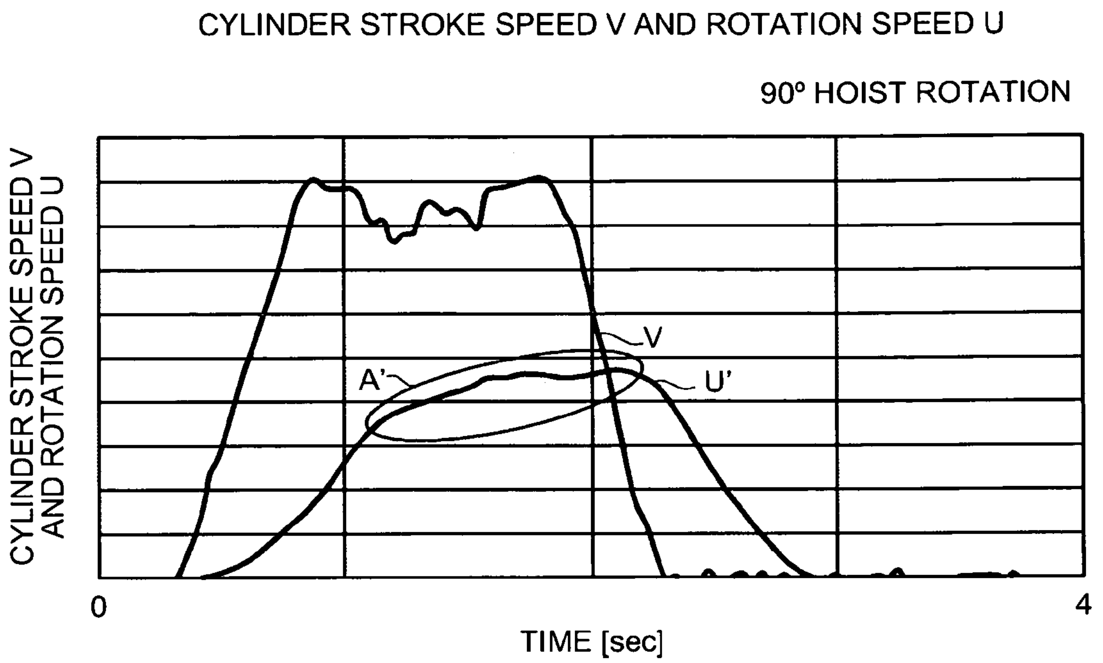
FIG. 11A is a diagram showing a comparative example corresponding to the embodiment of FIG. 10, and is a diagram showing the changes of actuation speeds over time of the hydraulic actuator and electric actuator during the combined actuation.
Figure 11B:
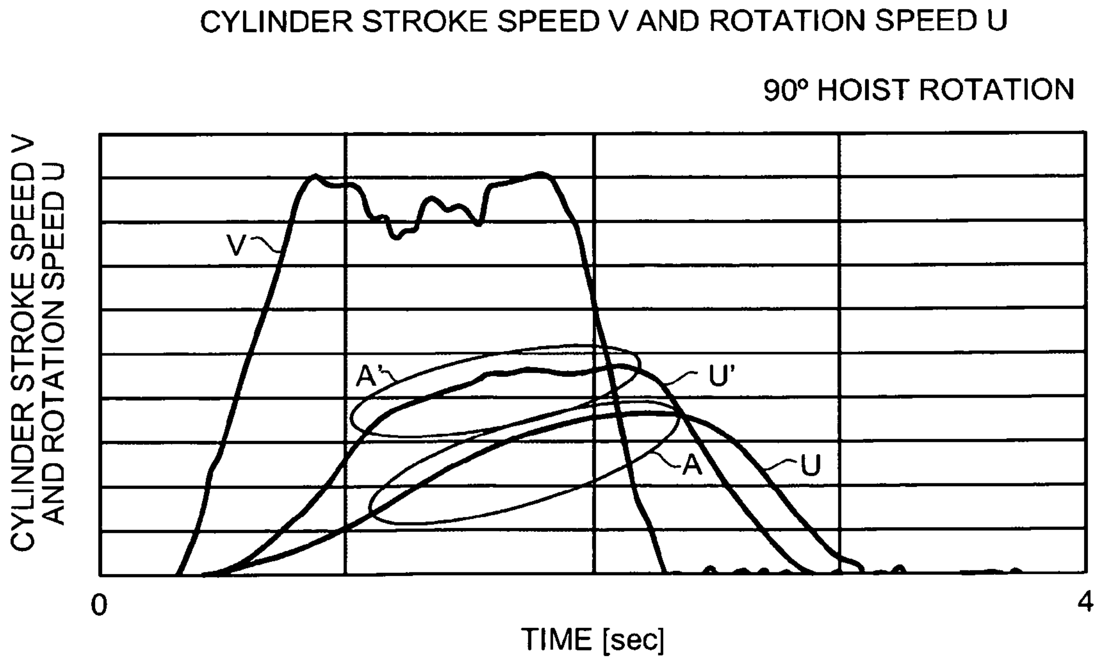
FIG. 11B is a diagram showing the changes of actuation speeds over time of the hydraulic actuator and electric actuator during the combined actuation in the embodiment of FIG. 10.

FIGS. 11A and 11B correspond to FIGS. 7A and 7B, and show the comparative example and the embodiment of FIG. 10 in comparison. According to the embodiment of FIG. 10, the first control is performed when determined that the upper rotary body and the work machine are concurrently actuated. Therefore, as indicated by the letter A of FIG. 11B and the letter A' of FIG. 11A, the rotary speed U of the upper rotary body is suppressed compared with the speed U' of the comparative example, thereby achieving the speed matching between the upper rotary body and the work machine.

Figure 12:
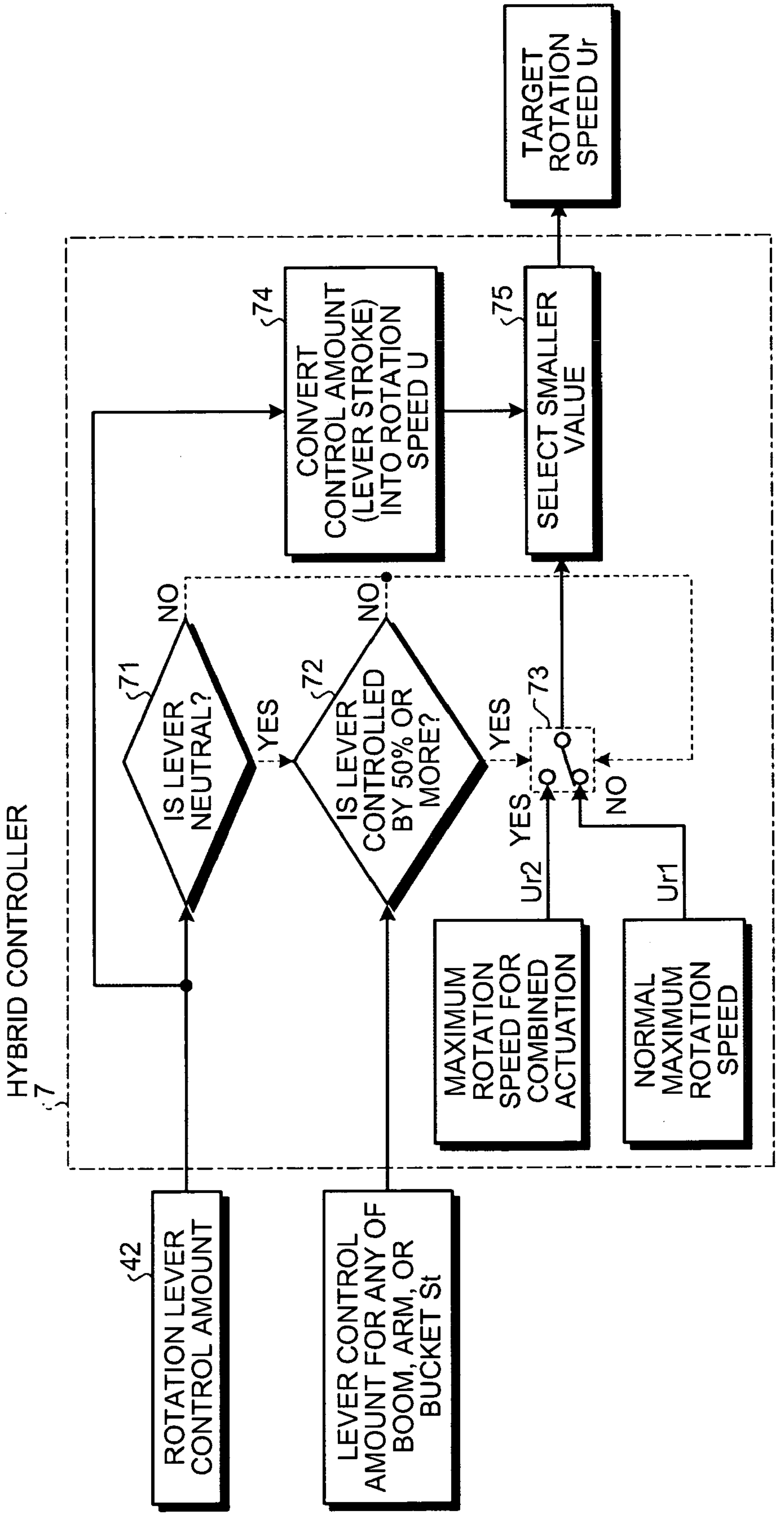
FIG. 12 is a diagram showing a control block according to another embodiment of the invention.

FIG. 12 corresponds to FIG. 5, and shows another embodiment in which the first control is performed by the hybrid controller 7. As shown in FIG. 12, in the embodiment, the first control is performed when the controlled variable of the work machine control lever, which is the largest controlled variable among the controlled variables of the boom control lever, the arm control lever, and the bucket control lever is controlled by 50% or more.

In the embodiment, the speed of the rotation generator motor 11 is restricted instead of the torque of the rotation generator motor 11. That is, in the conversion unit 74, the controlled variable (lever stroke) of the rotation control lever 42 is assumed to be the current rotary speed of the upper rotary body, and the controlled variable is converted into the rotary speed U.

If determined that the upper rotary body and the work machine are not concurrently actuated (one of the determination results made by the determination units 71 and 72 becomes negative), the switching unit 73 is switched to the NO side, and a maximum normal rotary speed Ur1 is input to the selection unit 75.

If determined that the upper rotary body and the work machine are concurrently actuated (both the determination results made by the determination units 71 and 72 become positive), the switching unit 73 is switched to the YES side, and a maximum rotary speed Ur2 in the combined actuation is input to the selection unit 75.

At this point, the maximum rotary speed Ur2 in the combined actuation is set to a value lower than that of the maximum normal rotary speed Ur1.

The selection unit 75 selects the smaller rotary speed as a target rotary speed Ur from the current rotary speed U input from the conversion unit 74, the maximum rotary speed Ur1 (normal) input from the switching unit 73, and the maximum rotary speed Ur2 (combined actuation) input from the switching unit 73. Then, the selection unit 75 outputs the target speed command to the inverter 9. Therefore, the rotation generator motor 11 is controlled such that the rotational speed becomes the target rotary speed Ur.

Figure 13A:
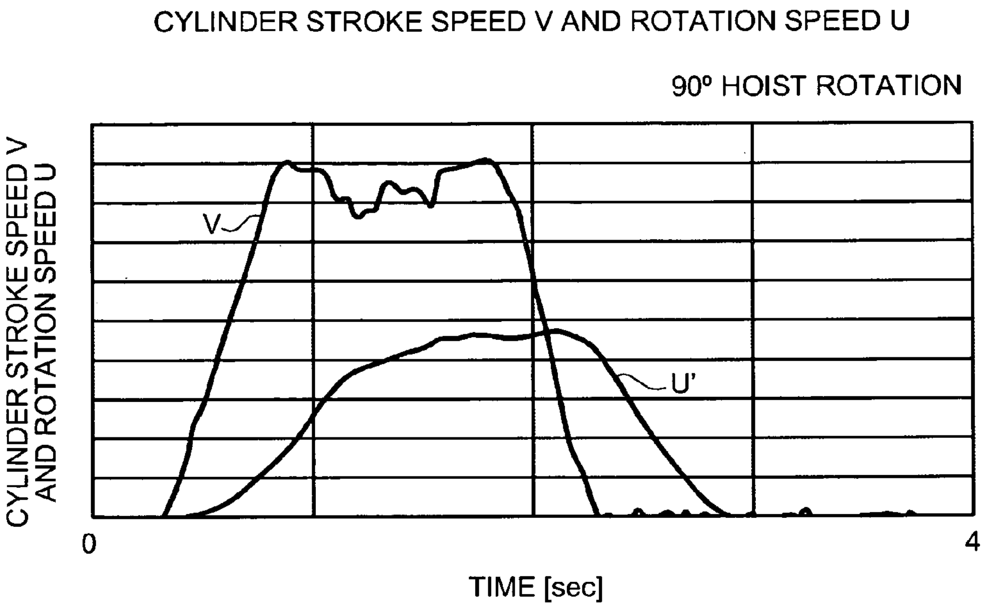
FIG. 13A is a diagram showing a comparative example corresponding to the embodiment of FIG. 1.
Figure 13B:
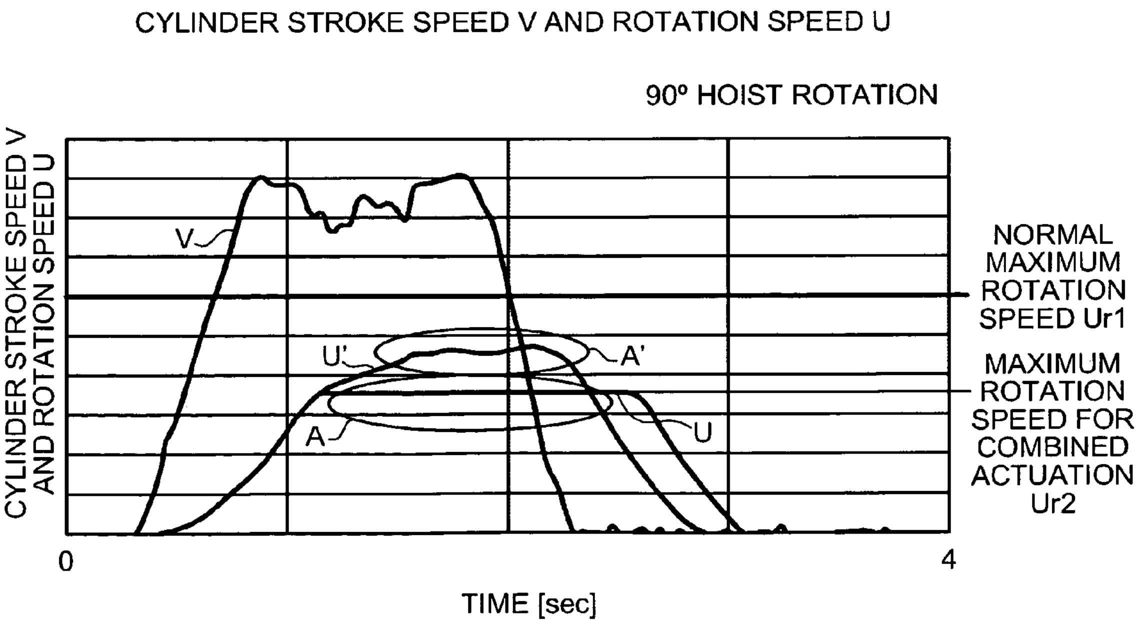
FIG. 13B is a diagram showing the changes of actuation speeds over time of the hydraulic actuator and electric actuator during the combined actuation in the embodiment of FIG. 12.

FIGS. 13A and 13B correspond to FIGS. 7A and 7B, and show the comparative example and the embodiment of FIG. 12 in comparison. According to the embodiment of FIG. 12, the first control is performed when determined that the upper rotary body and the work machine are concurrently actuated, and the rotary speed U of the upper rotary body is restricted to the maximum rotary speed Ur2 for the combined actuation. Therefore, as indicated by the letter A of FIG. 13B and the letter A' of FIG. 13A, the rotary speed U of the upper rotary body is suppressed compared with the speed U' of the comparative example, thereby achieving the speed matching between the upper rotary body and the work machine.

Figure 14:
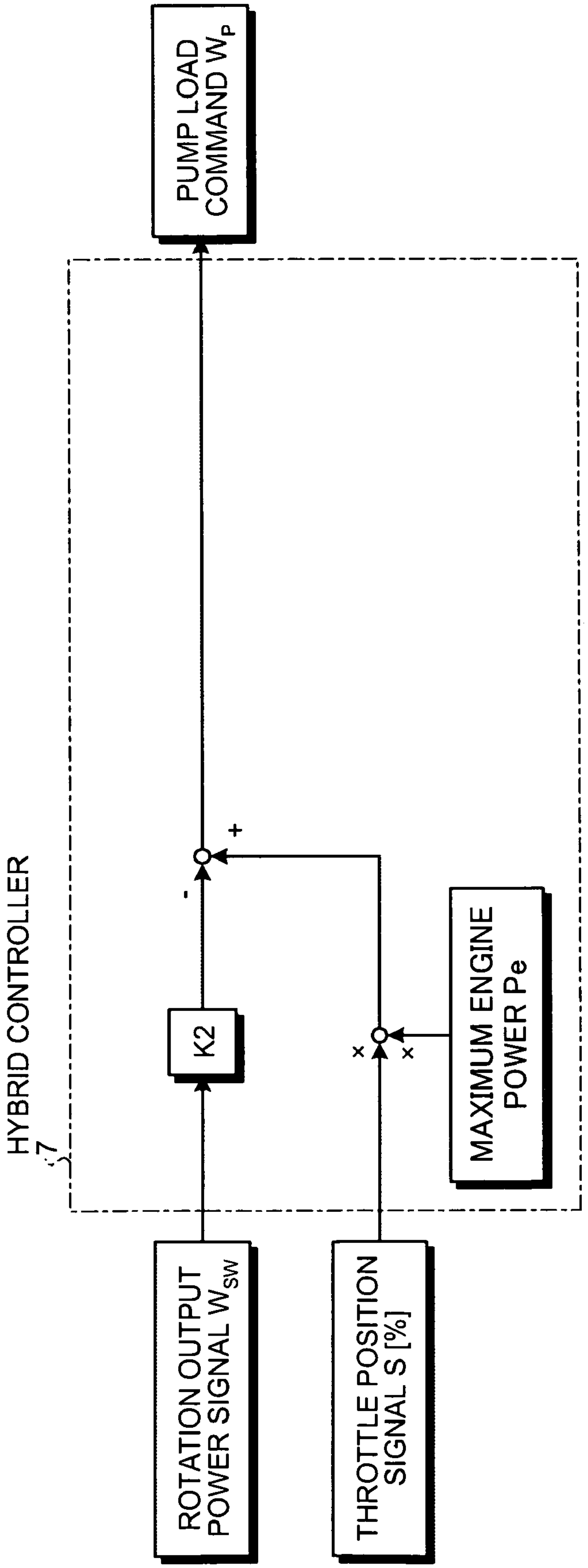
FIG. 14 is a diagram showing a control block according to another embodiment of the invention.

FIG. 14 corresponds to FIG. 5, and FIG. 14 shows another embodiment in which only the second control is performed by the hybrid controller 7. As shown in FIG. 14, in the second control performed in the embodiment, the pump load Wp is computed such that the load Wp of the hydraulic pump 3 decreases with an increase in rotary output power Wsw based on the rotary output power Wsw and the throttle position S, and the hydraulic pump 3 is restricted to the computed pump load Wp or less.

Figure 15A:
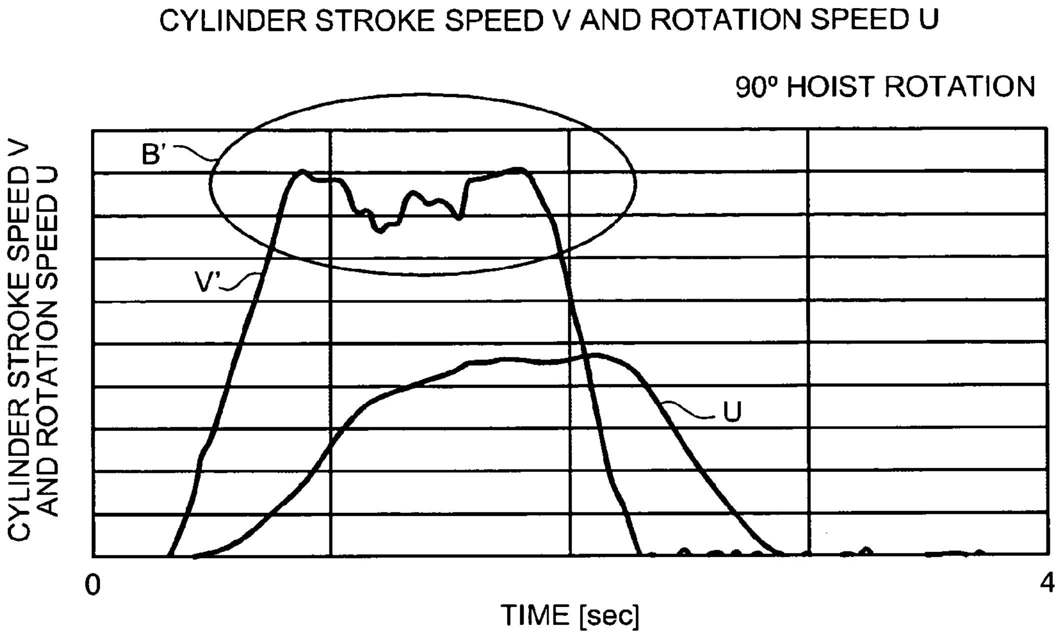
FIG. 15A is a diagram showing a comparative example corresponding to the embodiment of FIG. 14, and is a diagram showing the changes of actuation speeds over time of the hydraulic actuator and electric actuator during the combined actuation.
Figure 15B:
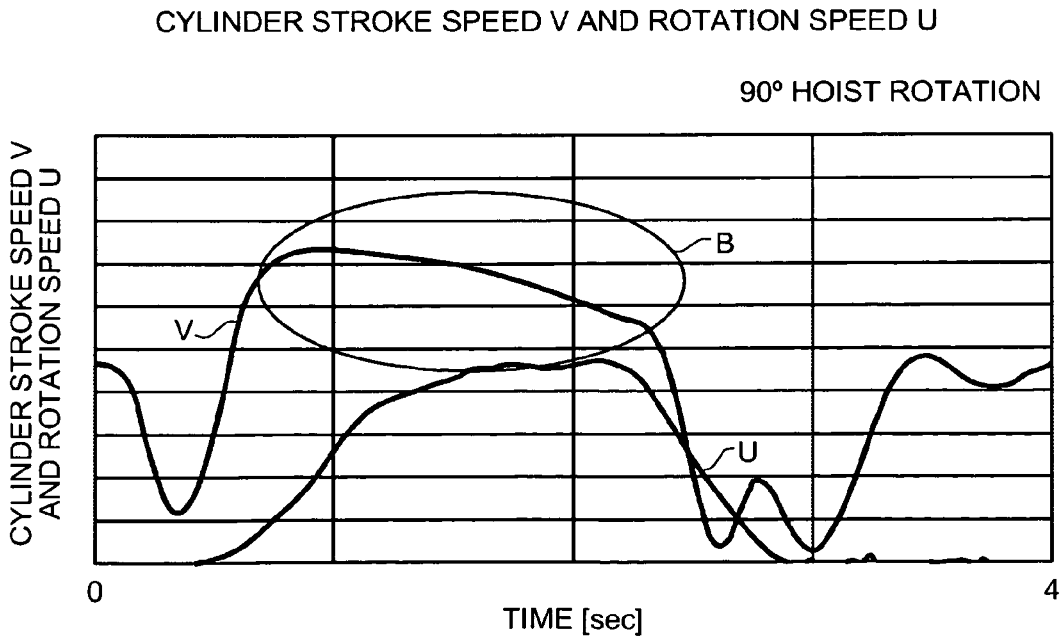
FIG. 15B is a diagram showing the changes of actuation speeds over time of the hydraulic actuator and electric actuator during the combined actuation in the embodiment of FIG. 14.

FIGS. 15A and 15B correspond to FIGS. 7A and 7B, and show the comparative example and the embodiment of FIG. 14 in comparison. According to the embodiment of FIG. 14, because the second control is performed to restrict the pump load of the hydraulic pump 3, as indicated by the letter B of FIG. 15B and the letter B' of FIG. 15A, the boom hydraulic cylinder stroke speed V is gradually decreased in the transition to the last half of the work in comparison with the speed V' of the comparative example, thereby achieving the speed matching between the upper rotary body and the boom to accurately perform the hoist rotary work with good operability.

Figure 16:
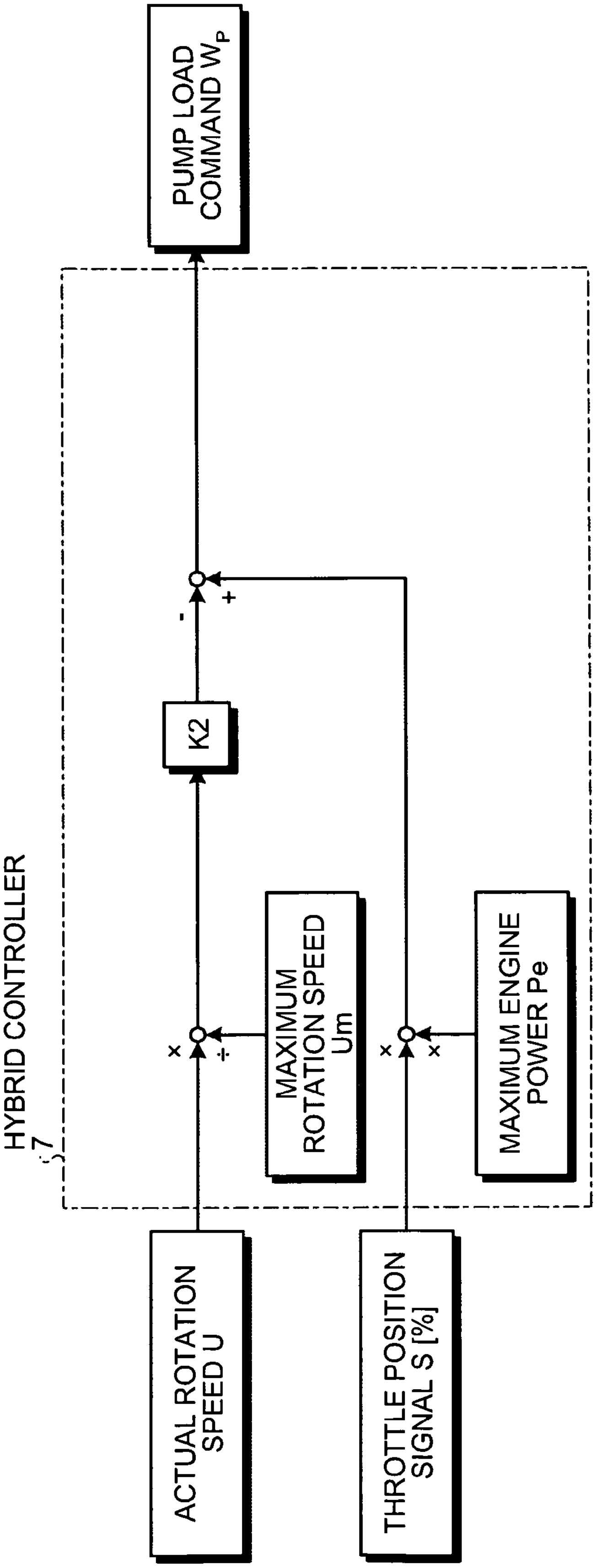
FIG. 16 is a diagram showing a control block according to another embodiment of the invention.

FIG. 16 corresponds to FIG. 5, and shows another embodiment in which the second control is performed by the hybrid controller 7. As shown in FIG. 16, in the embodiment, the pump load Wp is computed using the following equation (4) instead of the equation (2).

$$Wp=S\times Pe-U/Um\times K2 \qquad (4)$$

where

S: throttle position

Pe: engine maximum output power

U: current actual rotational speed (actual rotary speed) of upper rotary body

Um: maximum rotational speed of upper rotary body

K2: correction factor

U/Um of the right side of the U/Um corresponds to Wsw (rotary output power) of the equation (2).

As shown in the equation (4), in the second control, a ratio of U/Um of the current actual rotational speed to the maximum rotational speed of upper rotary body is assumed to be the rotary output power Wsw, and the hydraulic pump load Wp is computed such that load of the hydraulic pump 3 decreases with an increase in rotary speed ratio of U/Um, and the hydraulic pump 3 is restricted to the computed pump load Wp or less.

Figure 17A:
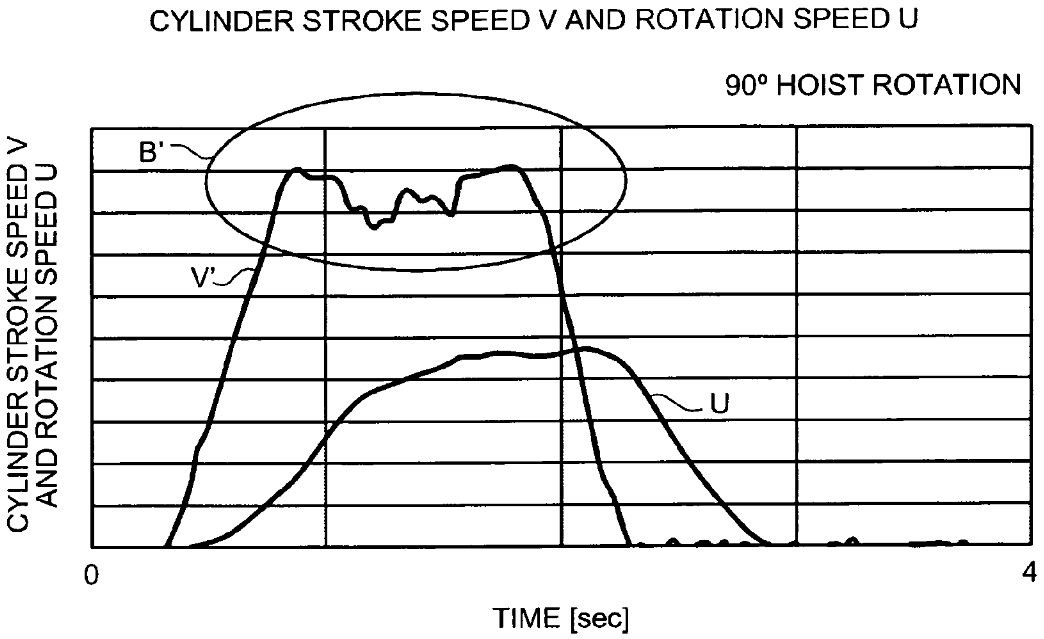
FIG. 17A is a diagram showing a comparative example corresponding to the embodiment of FIG. 16.
Figure 17B:
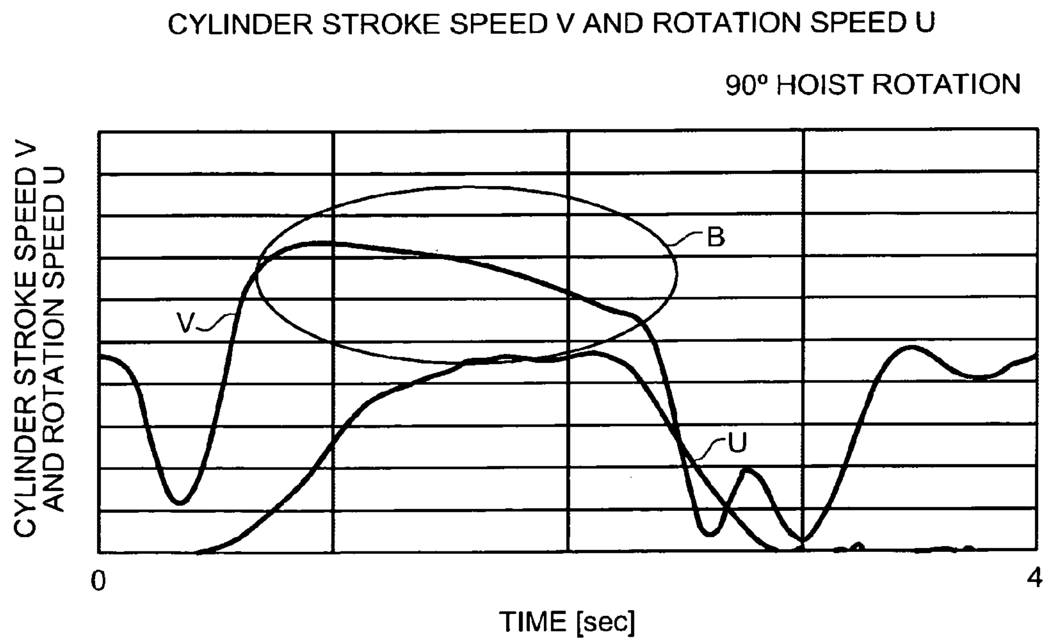
FIG. 17B is a diagram showing the changes of actuation speeds over time of the hydraulic actuator and electric actuator during the combined actuation in the embodiment of FIG. 16.

FIGS. 17A and 17B correspond to FIGS. 7A and 7B, and show the comparative example and the embodiment of FIG. 16 in comparison. According to the embodiment of FIG. 16, because the second control is performed to restrict the pump load of the hydraulic pump 3, as indicated by the letter B of FIG. 17B and the letter B' of FIG. 17A, the boom hydraulic cylinder stroke speed V is gradually delayed in the transition to the last half of the work in comparison with the speed V' of the comparative example, thereby achieving the speed matching between the upper rotary body and the boom to accurately perform the hoist rotary work with good operability.

The embodiments are described while the invention is applied to the hydraulic shovel. The invention can be applied to work machines including the construction machine and any construction machine other than the hydraulic shovel as long as the hydraulic actuator and the electric actuator are provided.

INDUSTRIAL APPLICABILITY

The control apparatus for the work machine according to the invention is suitable for the work machine including any construction machine having the configuration in which the hydraulic actuator and the electric actuator are provided. Particularly the invention is suitable for the construction machines such as the hydraulic shovel.

The invention claimed is:

1. A control apparatus for a work machine comprising:

a hydraulic pump which is driven by an engine;

a hydraulic actuator to which pressurized oil is supplied, the pressurized oil being discharged from the hydraulic pump;

a generator motor which is coupled to an output shaft of the engine;

a storage device which accumulates electric power generated by the generator motor and supplies electric power to the generator motor;

an electric actuator which is driven by the electric power generated by the generator motor and/or the electric power accumulated in the storage device;

a determination unit which determines whether or not the hydraulic actuator and the electric actuator are concurrently actuated; and a control unit for restricting a torque or a speed of the electric actuator when the determination unit determines that the hydraulic actuator and the electric actuator are concurrently actuated.

2. The control apparatus for a work machine according to claim 1, wherein a torque limit or a speed limit of the electric actuator is controlled to be decreased as a load on the hydraulic pump or the hydraulic actuator is decreased.

3. The control apparatus for a work machine according to claim 1, wherein the hydraulic actuator actuates work equipment, and the electric actuator actuates an upper rotary body.

4. The control apparatus for a work machine according to claim 1, wherein the hydraulic actuator is a hydraulic actuator which includes a boom hydraulic actuator actuating a boom, the electric actuator is an upper rotary body electric actuator actuating an upper rotary body, and the determination unit determines whether or not a hoist rotary work is performed, in which the upper rotary body electric actuator actuating the upper rotary body so as to rotate the upper rotary body while the boom hydraulic actuator moves the boom upward.

5. A control apparatus for a work machine comprising:

a hydraulic pump which is driven by an engine;

a hydraulic actuator to which pressurized oil is supplied, the pressurized oil being discharged from the hydraulic pump;

a generator motor which is coupled to an output shaft of the engine;

a storage device which accumulates electric power generated by the generator motor and supplies electric power to the generator motor;

an electric actuator which is driven by the electric power generated by the generator motor and/or the electric power accumulated in the storage device; and a control unit for restricting load of the hydraulic pump such that the load of the hydraulic pump is decreased as power of the electric actuator is increased.

6. A control apparatus for a work machine comprising:

a hydraulic pump which is driven by an engine;

a hydraulic actuator to which pressurized oil is supplied, the pressurized oil being discharged from the hydraulic pump;

a generator motor which is coupled to an output shaft of the engine;

a storage device which accumulates electric power generated by the generator motor and supplies electric power to the generator motor;

an electric actuator which is driven by the electric power generated by the generator motor and/or the electric power accumulated in the storage device;

a determination unit which determines whether or not the hydraulic actuator and the electric actuator are concurrently actuated;

a first control unit which restricts a torque or a speed of the electric actuator when the determination unit determines that the hydraulic actuator and the electric actuator are concurrently actuated; and a second control unit for restricting load of the hydraulic pump such that the load of the hydraulic pump is decreased as power of the electric actuator is increased.

* * * * *